(12) United States Patent
Knaus et al.

(10) Patent No.: US 10,894,845 B2
(45) Date of Patent: Jan. 19, 2021

(54) POLYMERIZATION OF MICHAEL-TYPE AND HETEROCYCLIC MONOMERS

(71) Applicant: Technische Universität München, Munich (DE)

(72) Inventors: Maximilian Knaus, Munich (DE); Marco Giuman, Munich (DE); Bernhard Rieger, Elchingen (DE)

(73) Assignee: Technische Universität München, Munich (DE)

( * ) Notice: Subject to any disclaimer, the term of this patent is extended or adjusted under 35 U.S.C. 154(b) by 60 days.

(21) Appl. No.: 16/087,278

(22) PCT Filed: Mar. 22, 2017

(86) PCT No.: PCT/EP2017/056896
§ 371 (c)(1),
(2) Date: Sep. 21, 2018

(87) PCT Pub. No.: WO2017/162784
PCT Pub. Date: Sep. 28, 2017

(65) Prior Publication Data
US 2019/0315894 A1    Oct. 17, 2019

(30) Foreign Application Priority Data

Mar. 22, 2016 (EP) .................... 16161796
Sep. 26, 2016 (EP) .................... 16190707
Sep. 29, 2016 (EP) .................... 16191393

(51) Int. Cl.
*C08F 20/44* (2006.01)
*C08F 20/18* (2006.01)
(Continued)

(52) U.S. Cl.
CPC .............. *C08F 20/44* (2013.01); *C08F 4/005* (2013.01); *C08F 20/18* (2013.01); *C08F 20/30* (2013.01);
(Continued)

(58) Field of Classification Search
CPC .......... C08F 20/44; C08F 4/005; C08F 20/18; C08F 20/30; C08F 20/54; C08F 28/02; C08F 30/02
(Continued)

(56) References Cited

U.S. PATENT DOCUMENTS 3,326,870 A    6/1967   Kohei et al.
3,635,924 A    1/1972   Nakaguchi et al.
(Continued)

FOREIGN PATENT DOCUMENTS

CN    104031191 A    9/2014
DE    3733313        4/1989
(Continued)

OTHER PUBLICATIONS

Kuran, W. et al., Terpolymerization of polar vinyl monomers with butadiene and styrene in—the presence of Lewis acids. Macromol Chem Phys. 1977: 178(7)1873-9.*
(Continued)

*Primary Examiner* — William K Cheung
(74) *Attorney, Agent, or Firm* — Ballard Spahr LLP

(57) ABSTRACT

A system for precision polymerization is disclosed comprising at least one Michael-type monomer and a metal compound $MR^1R^2R^3$ as sole catalyst and initiator, wherein M is aluminum, gallium or indium, each of $R^1$, $R^2$, and $R^3$ independently is Cl, F, I, Br, linear, branched or cyclic alkyl, heterocycloalkyl, linear, branched or cyclic alkenyl, heterocycloalkenyl, linear, branched, or cyclic alkenyl, linear, branched, or cyclic alkinyl, heterocycloalkinyl, linear,
(Continued)

branched, or cyclic alkoxy, aryl, heteroaryl, aryloxy, silyl, metallocenyl, nitro, nitroso, hydroxy, or carboxyl, wherein each alkyl, alkenyl, alkinyl or alkoxy group independently has up to 12 carbon atoms, wherein each aryl or heteroaryl independently has 5 to 14 ring atoms, wherein any hetero group has at least one hetero atom selected from the group consisting of O, S, and N, wherein each alkyl, alkenyl, alkinyl or alkoxy, heterocycloalkyl, heterocycloalkenyl, heterocycloalkinyl, aryl, heteroaryl, aryloxy group can be substituted by 1 up to the highest possible number of halogen atoms, or at least one electron-donating or electron-withdrawing group; with the proviso that not all three groups $R^1$, $R^2$, and $R^3$ are halogen, hydroxy, or alkoxy or wherein two of $R^1$, $R^2$, and $R^3$ together with M form a substituted or unsubstituted cyclic or heterocyclic group having 3 to 6 atoms, wherein a heterocyclic group has at least one hetero atom selected from the group consisting of O, S, and N; as well as processes for preparing polymers and the polymers obtained therewith.

16 Claims, 11 Drawing Sheets

(51) Int. Cl.
| | |
|---|---|
| C08F 20/30 | (2006.01) |
| C08F 20/54 | (2006.01) |
| C08F 28/02 | (2006.01) |
| C08F 30/02 | (2006.01) |
| C08F 4/00 | (2006.01) |

(52) U.S. Cl.
CPC .............. *C08F 20/54* (2013.01); *C08F 28/02* (2013.01); *C08F 30/02* (2013.01)

(58) Field of Classification Search
USPC ......................................................... 526/238
See application file for complete search history.

(56) References Cited

U.S. PATENT DOCUMENTS

| | | |
|---|---|---|
| 2004/0015029 A1 | 1/2004 | Lange et al. |
| 2018/0086858 A1 | 3/2018 | Knaus et al. |

FOREIGN PATENT DOCUMENTS

| | | |
|---|---|---|
| WO | WO 96/36647 | 11/1996 |
| WO | PCT/EP2016/056639 | 3/2016 |
| WO | WO 2016/156243 | 10/2016 |
| WO | PCT/EP2017/000359 | 3/2017 |
| WO | WO 2017/162334 | 9/2017 |

OTHER PUBLICATIONS

Salzinger, S. et al., Mechanistic Studies on Initiation and Propagation of Rare Earth Metal-Mediated Group Transfer Polymerization of Vinylphosphonates. J Am Chem Soc. 2013; 1351351:13030-40.*
Beachley, O.T., Jr. et al., Main Group Compounds as Amphoteric Ligands to Transition Metals. Synthesis and Molecular Structureof Cr(CO)$_5$[PPh$_2$CH$_2$Ga(CH$_2$CMe$_3$)$_2$·NMe$_3$]. Organometallics. 1996; 15:5170-4.
Boyer et al., Etude dans la serie des organogallylazoles I. Synthese et structure. J Organometallic Chem. 1981; 215(2):157-64 (Article in French; Summary Provided).
Brown et al., Studies in Stereochemistry. I. Steric Strains as a Factor in the Relative Stability of Some Coordination Compounds of Boron. JACS. 1942; 64(2):325-9.
Dubois et al., Macromolecular engineering of polylactones and polylactides. 4. Mechanism and kinetics of lactide homopolymerization by aluminum isopropoxide. Macromolecules. 1991; 24(9):2266-70.
Grimme et al., The Mechanism of Dihydrogen Activation by Frustrated Lewis Pairs Revisited. Angew Chem Int Ed. 2010; 49(8):1402-5.
He, J. et al., Synthesis of Pyridine- and 2-Oxazoline-Functionalized Vinyl Polymers by Alane-Based Frustrated Lewis Pairs. Synlett. 2014; 25(11):1534-8.
Karsch et al., Functional trimethylphosphine derivatives. 21. (Phosphinomethyl)aluminum compounds: phosphinomethyl-bridged dimers and x-ray structures of [Me$_2$AlCH$_2$PMe$_2$]$_2$ and [ClAl(CH$_2$PMe$_2$)$_2$]$_2$. Organometallics. 1985; 4(2):231-8.
Klatt et al., Generation of functionalized aryl and heteroaryl aluminum reagents by halogen-lithium exchange. Chem Commun. 2013; 49(62):6953 (3 pages).
Kuran, W. et al., Terpolymerization of polar vinyl monomers with butadiene and styrene in—the presence of Lewis acids. Macromol Chem Phys. 1977; 178(7):1873-9.
Lee, H.-Y. et al., Copolymerization of a polyhydrocarbon macromonomer with methyl acrylate and acrylonitrile in the presence of a Lewis acid. Acta Polymer. 1994; 45(6):413-8.
Locke et al., Dialkylindium derivatives of unsaturated nitrogen heterocycles—preparation, spectroscopic properties and the use in MOVPE. J Organometallic Chem. 1991; 420(1):1-12.
Merino et al., Stereocontrolled Approach to Phenyl Cyclitols from (SR)-[(p-Tolylsulfinyl)methyl]-p-quinol. J Org Chem. 2009; 74(7):2824-31.
Salzinger, S. et al., Mechanistic Studies on Initiation and Propagation of Rare Earth Metal-Mediated Group Transfer Polymerization of Vinylphosphonates. J Am Chem Soc. 2013; 135(35):13030-40.
Stephan et al., Frustrated Lewis Pairs: Metal-Free Hydrogen Activation and More. Angew Chem Int Ed. 2010; 49(1):46-76.
Tang, C. et al., RAFT Polymerization of Acrylonitrile and Preparation of Block Copolymers Using 2-Cyanoethyl Dithiobenzoate as the Transfer Agent. Macromolecules. 2003; 36(23):8587-9.
Taniguchi et al., Polymerizations by diethylpicolylaluminum. Kobunshi Kagaku. 1967; 24(263):193-7 (Abstract only).
Tolman, Steric Effects of Phosphorus Ligands in Organomettalic Chemistry and Homogeneous Catalysis. Chem Rev. 1977; 77(3):313-48.
Xu et al., Probing Site Cooperativity of Frustrated Phosphine/ Borane Lewis Pairs by a Polymerization Study. J Am Chem Soc. 2014; 136(5):1774-7.
Zhang et al., Alane-Based Classical and Frustrated Lewis Pairs in Polymer Synthesis: Rapid Polymerization of MMA and Naturally Renewable Methylene Butyrolactones into High-Molecular-Weight Polymers. Angew Chem Int Ed. 2010; 49:10158-62.
Zhang et al., Lewis pair polymerization by classical and frustrated Lewis pairs: acid base and monomer scope and polymerization mechanism. Dalton Trans. 2012; 41(30):9119 (17 pages).
International Search Report and Written Opinion dated Jul. 21, 2016 by the International Searching Authority for Application No. PCT/ EP2016/056639, filed Mar. 24, 2016, and published as WO 2016/ 156243 on Oct. 6, 2016 (Applicant—Technische Universiät München) (10 pages).
International Preliminary Report on Patentability dated Oct. 3, 2017 by the International Searching Authority for Application No. PCT/ EP2016/056639, filed Mar. 24, 2016, and published as WO 2016/ 156243 on Oct. 6, 2016 (Applicant—Technische Universiät München) (8 pages).
International Search Report and Written Opinion dated May 12, 2017 by the International Searching Authority for Application No. PCT/EP2017/000359, filed Mar. 22, 2017, and published as WO 2017/162334 on Sep. 28, 2017 (Applicant—Technische Universität München) (14 pages).
International Search Report and Written Opinion dated Aug. 11, 2017 by the International Searching Authority for Application No. PCT/EP2017/056896, filed Mar. 22, 2017, and published as WO

(56) References Cited

OTHER PUBLICATIONS

2017/162784 on Sep. 28, 2007 (Applicant—Technische Universität München) (10 pages).

* cited by examiner

POLYMERIZATION OF MICHAEL-TYPE AND HETEROCYCLIC MONOMERS

CROSS-REFERENCE TO RELATED APPLICATIONS

This application is a U.S. National Phase Application of International Application No. PCT/EP2017/056896, filed Mar. 22, 2017, which claims priority to European Application Nos. 16161796.4, filed Mar. 22, 2016, 16190707.6, filed Sep. 26, 2016, and 16191393.4, filed Sep. 29, 2016, each of which are hereby incorporated by reference in their entirety.

FIELD OF THE INVENTION

The present invention is concerned with a process of polymerizing monomers in the presence of a catalyst/initiator, a method for identifying a catalyst useful for polymerisation of Michael-type monomer, a process of preparing a functionalized polymer and a polymer obtained therewith.

BACKGROUND

The polymerization of Michael-type based monomers, for example acryl-based monomers, like methylacrylate, is well-known and common technology, such as radical polymerization, can be used. However, this common technology has its drawbacks and limitations. Radical initiated polymerizations are difficult to control with regard to tacticity and dispersity of polymers. Moreover, demanding monomers like acryl esters having bulky substituent groups, are difficult to polymerize and can be obtained only in low yields or with time and cost consuming processes. Tacticity and dispersity index are hardly or not to control for monomers like acrylonitrile. With the known methods such polymerization reactions could be controlled only by using catalysts comprising noble metals or rare earth metals which cause high cost, need complex catalyst synthesis and/or are detrimental for the environment.

Acryl-based polymers have been prepared in technical processes using free radical polymerization. Examples are the production of polymethacryl acid methyl ester (PMMA), or polyacrylonitrile (PAN). Those polymers are well-known and are used for example as fibers, in paints and dyes. The use of free radicals for polymerization, however, yields polymers with high polydispersity and the reaction is difficult to control. Many attempts have been made to find alternative processes to control the reaction of acrylic monomers. In one approach, acrylic polymers were made by using pure acrylonitrile in solution using the so-called RAFT-technology. This technique, however, does not allow to produce polyacrylonitrile with higher molecular weight but yields polymers with a molecular mass of about up to 16,000 g/mol and with a low dispersity of about 1.1 (see C. Tang et al., Macromolecules 2003, 36, 8587-8589).

On the other hand, it was possible to obtain polyacrylonitrile having high molecular weight (such as Mn>200,000 g/mol) with a lower polydispersity index (PDI) of 1.7-2.0 by using bis(thiobenzoyl)disulfide or bis(thiophenylacetoyl)disulfide. The use of activators for regeneration of RAFT-reagents allows to obtain polymers having a higher molecular weight, however, long reaction times are necessary, the yield is low and reagents for reduction which are expensive and partially toxic, like Sn-(2-ethylhexanoat) have to be applied.

Chen et al. (Y. Zhang et al., Angewandte Chemie 2010, 122, 10356-10360) used Lewis pairs for polymerization to overcome these disadvantages. It was assumed by Chen et al. that the polymerization occurs via a zwitter ionic intermediate structure, wherein the Lewis acid activates the monomer and the Lewis base binds to the activated monomer. Although some acrylic monomers could be polymerized with this technology, it was not possible to use this described process for polymerization of acrylonitrile or for sterically hindered acrylate esters. Thus, the Lewis pairs proposed by Chen et al. for polymerization could be used only for specific monomers, but not for sterically or electronically demanding monomers.

As outlined in Zhang et al. (Dalton transactions 2012, 41, 9119-9134, Synlett 2014, 25, 1534) it was not possible to convert furfurylmethacrylate. Another monomer, n-butyl-methacrylate, could be reacted by using Lewis pair catalysis only with a yield of 35%.

Some Michael-type monomers could not or with low yield be polymerized with methods of the prior art, e.g. vinylphosphonates, vinylpyridines or vinylsulfonates. The polymerization and results thereof regarding molecular weight of the polymer, PDI of the polymer, yields, and/or turnover frequencies (TOF) of the catalyst were insufficient.

It is well-known to use aluminum or boron compounds for hydrogenation of unsaturated compounds. Many aluminum and boron compounds are known in this regard. For example it was known to use diethyl-[(4-methyl-pyridin-2-yl)-methyl]aluminum or diethyl-(2-pyridinylmethyl)aluminum for hydrogenation of esters.

Furthermore it has been described by the present inventors that polymers can be prepared from Michael-type monomers by using a Lewis pair as catalyst and initiator compound. For the preparation of polymers a monomer, for example an α-acidic Michael-type monomer is contacted with a Lewis acid to form a zwitterionic type complex and after adding a Lewis base the polymerization reaction is started.

Moreover, it has been described that 1-lactide and ε-caprolactone can be polymerized using aluminum-based Lewis acid (see Nakayama et al.: "Controlled ring-opening polymerization of l-lactide and ε-caprolactone catalyzed by aluminum-based Lewis pairs or Lewis acid alone.", Journal of Polymer Science, Part A: Polymer Chemistry, 2017, 55(2), 297-303, Dec. 10, 2016). Rather narrow molecular weight distribution (MWD) could be obtained when using a Lewis pair. When only a Lewis acid was used MWD was rather broad. Moreover, an alcohol such as benzyl alcohol was necessary as initiator. Thus, any polymer obtained had a benzyl group as end group.

Ring-opening polymerization for polylactones and polylactides has been shown to be very time consuming (see Dubois et al., "Macromolecular engineering of polylactones and aluminum isopropoxide." Macromolecules, 1991, 24, 2266-2270; Akatsuka et al. "Alcohol/Methylaluminum diphenolate systems as novel versatile initators for synthesis of narrow molecular weight distribution polyester and polycarbonate." Macromoelcules, 1995, 1320-1322; Hormnirum et al. "Remarkable Stereocontrol in the Polymerization of Racemic Lactide Using Aluminum Initiators Supported by Tetradentate Aminophenoxide Ligands" JACS 2004, 126, 2688-2689). Moreover, an alcohol such as benzyl alcohol was necessary as starter. Thus, any polymer obtained had a benzyl group as end group.

Although many methods for polymerization of monomers are known, there are still problems when sterically or electronically demanding monomers are to be polymerized, in particular polymerized in controlled manner, or for providing polymers with increased syndio- or iso-tacticity.

Thus, it was an object of the present invention to provide an improved method for polymerization of sterically and/or electronically demanding Michael-type monomers, such as substituted or unsubstituted acrylates, methacrylates, acrylonitrile, acrylamides, methacrylamides, vinylphosphonates or vinyl sulfonates, for heteroaromatic Michael-type monomers, or heterocyclic monomers, such as lactones, lactams, or lactides, or combinations thereof, in higher yields, in shorter time periods and/or with controlled tacticity and dispersity. It was another object of the present invention to provide an improved method for preparing copolymers from carbon dioxide and monomers comprising a heterocyclic ring with low PDI and high molecular mass.

It was an object of the present invention to provide catalytic compounds and processes for polymerizing monomers, such as Michael-type monomers, in particular demanding Michael-type monomers that until now were not available for controlled polymerization. It was a further object of the present invention to provide catalytic compounds and processes for polymerizing difficult to polymerize monomers, like Michael-type monomers, which allow to obtain polymers in a higher yield and/or with new properties and/or with reactive or functional end groups. It was a further object of the present invention to provide catalytic compounds and processes for polymerizing Michael-type, heterocyclic monomers with improved yield, PDI, turnover frequency and/or molecular mass. It was a further object of the present invention to provide a method for preparing polycarbonates with high yield, low PDI and high molecular mass. Furthermore, it was an object of the present invention to provide a flexible process for preparing copolymers the properties of which can be tailored by varying monomers and conditions.

It was a further object of the present invention to provide catalytic processes and catalysts which are environmentally friendly, less time consuming and more efficient than methods of the state of art.

SUMMARY OF THE INVENTION

The problems are solved by the methods and the compounds and processes of the present invention.

The present invention provides catalyst compounds for catalysis and initiation as well as methods for polymerization of monomers like Michael-type monomers as defined in the claims. The new methods and systems allow polymerization of monomers that were not or difficult to polymerize until now. For example, the methods of the present invention can be used for the polymerization of electronically and/or sterically demanding Michael-type monomers such as phosphonate or sulfonate derived monomers, monomers having a substitution on the α-position, heteroaromatic monomers or acrylonitrile, for polymerization by ring-opening of oxygen or nitrogen containing rings and for copolymerisation of carbon dioxide with heterocyclic monomers of the present invention.

It was found that the above mentioned problems are solved by using methods or catalysts as defined in the claims. Surprisingly, it was found that polymers with desirable properties can be prepared using a specific metal compound as sole catalyst/initiator without the need for any other cocatalyst, initiator or Lewis base, by selecting an optimal metal catalyst for a specific monomer based on parameters and test methods as described below. In particular it was found that when using a preselected pair of monomer and metal compound there is no need to use any further catalyst and/or initiator, in particular there is no need to use a Lewis base to start or continue the polymerization reaction. In other words, by determining the optimal pair of catalyst and monomer there is no need for any further activating, initiating, or catalyzing compound and yet the present system and process allows to prepare polymers of sterically and/or electronically demanding Michael monomers or of heterocyclic monomers or mixtures thereof in high yield, in short time, resulting in polymers with controlled, pre-determined or regulated molecular mass with excellent yield and/or with controlled tacticity.

Furthermore the dispersity of the polymers can be adapted. Another surprising advantage when using a system or method of the present invention is that a polymer with a functional group can be obtained in an easy manner. It was surprisingly found that a system of a monomer component and an adapted metal compound as defined provide for activating monomers, e.g. Michael-type monomers or heterocyclic monomers, for starting polymerization and for maintaining a polymerization reaction. Furthermore the combination of the present invention allows the production of novel polymers with properties that were not available until now and can be used for polymerization of demanding monomers. The critical point is that the Lewis acid can be used as sole catalyst and initiator when monomer and catalyst are adapted to each other. It was found that electrophilicity of the monomer to be polymerized and activity of a Lewis acid have to be adapted and then allow polymerization of monomers. Thus, when a electron-deficient monomer like acrylonitrile shall be polymerized, a highly active metal compound as defined has to be used as catalyst/activator, which does not catalyze electron-rich monomers. If on the other hand an electron-rich monomer is to be polymerized, a metal compound with low activity has to be used for good results. For monomers that have a "medium" electrophilicity a metal compound having medium activity is used. The selection of the optimal pair of monomer/catalyst is described below. It has been found that a metal compound having a suitable activity can be found by using fluoride affinity index (FIA) as parameter.

The present invention is concerned with a system for precision polymerization comprising a monomer component as defined and a metal compound as defined. The monomer component can comprise one type of monomer or a mixture of two or more types of monomers. The monomer component can comprise at least one Michael-type monomer, and/or at least one heterocyclic monomer, and/or a combination of carbon dioxide and a heterocyclic monomer, such as oxiran or epoxide, azetidine, aziridine; or a mixture of any of them. In this regard "a monomer" means a type of monomer rather than one molecule. Thus, the monomer component can comprise only one type of Michael-type monomer or a mixture of different types of Michael-type monomers, or only one type of heterocyclic monomer or a mixture of heterocyclic monomers, or a mixture of one or more Michael-type monomers and one or more heterocyclic monomers and/or carbondioxide.

The types of monomers are outlined below in more detail. In the following when it is referred to "monomer component" any of the above monomers or mixture there of is comprised except the context defines otherwise.

The other important part of the system is a metal compound of formula I: $MR^1R^2R^3$, as sole catalyst and initiator, wherein M is aluminum, gallium, or indium; each of $R^1$, $R^2$, and $R^3$ independently is Cl, F, I, Br, linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, nitro, nitroso, hydroxy, or carboxyl, wherein each alkyl, alkenyl, alkynyl or alkoxy group independently has up to 12 carbon atoms, wherein each aryl or heteroaryl independently has 5 to 14 ring atoms, wherein any hetero group has at least one hetero atom selected from 0, S or N, wherein each alkyl, alkenyl, alkynyl or alkoxy, heterocycloalkyl, heterocycloalkenyl, heterocycloalkynyl, aryl, heteroaryl, aryloxy group can be substituted by 1 up to the highest possible number of halogen atoms, or at least one electron-donating or electron-withdrawing group, with the proviso that not all three groups $R^1$, $R^2$, and $R^3$ are halogen, hydroxy, or alkoxy; or wherein two of $R^1$, $R^2$, and $R^3$ together with M form a substituted or unsubstituted cyclic group having 3 to 6 atoms. When two of $R^1$, $R^2$, and $R^3$ form a cyclic group with metal, the cyclic group comprises 2 to 5 carbon atoms or 2 to 4 carbon atoms and at least one hetero atom selected from O, S or N.

In the following when it is referred to "metal compound", a compound of formula I is meant when the context does not define otherwise. These metal compounds are suitable for providing higher turnover numbers, higher molecular mass, lower PDIs and higher yields for the polymerization of a monomer component, such as Michael-type monomers and/or heterocyclic monomers, even for electronically and/or sterically demanding monomers. The metal compounds of the present invention in addition have the advantage that they are more environmental friendly and cheaper than rare earth metal or noble metal compounds.

Thus, in one embodiment a system for polymerization is provided comprising a monomer component, and a metal compound as sole catalyst and initiator, wherein the monomer component comprises at least one Michael-type monomer, and wherein the metal compound is a compound of formula I as defined above.

Furthermore, a system for polymerization is provided comprising a monomer component, and a metal compound as sole catalyst and initiator, wherein the monomer component comprises at least one heterocyclic monomer selected from the group consisting of a substituted or unsubstituted lactone having up to 9 ring atoms, a substituted or unsubstituted lactam having up to 9 ring atoms, or a substituted or unsubstituted 1,4-dioxan-2,4-dione, or a mixture thereof.

Moreover, a system for polymerization is provided comprising a monomer component, and a metal compound as sole catalyst and initiator, wherein the monomer component comprises a combination of $CO_2$ and at least one comonomer selected from the group of substituted or unsubstituted oxirane with 3 or 4 ring atoms, substituted or unsubstituted aziridine or azetidine; further monomers such as substituted or unsubstituted lactone having up to 9 ring atoms, substituted or unsubstituted lactam having up to 9 ring atoms, or substituted or unsubstituted 1,4-dioxan-2,4-dione, Michael-type monomers or a mixture thereof can be added, Additionally, the invention provides a process for polymerization of a monomer component using a metal compound of formula I as sole catalyst and initiator. The monomer component can comprise any of the monomers as defined above and the metal compound is a compound of formula I and can be adapted to the monomer as outlined below.

The invention provides a process for polymerization of a monomer component using a metal compound as sole catalyst and initiator, which comprises the steps:

a) contacting a monomer component with an adapted metal compound, optionally dissolved in an organic solvent, wherein the monomer component comprises at least one of a Michael-type monomer, substituted or unsubstituted lactone having up to 9 ring atoms, substituted or unsubstituted lactam having up to 9 ring atoms, substituted or unsubstituted 1,4-dioxan-2,4-dione, or a mixture thereof, and/or a combination of $CO_2$ and at least one comonomer selected from the group of substituted or unsubstituted oxirane with 3 or 4 ring atoms, substituted or unsubstituted aziridine or azetidine, or a mixture thereof, wherein the metal compound is $mR^1R^2R^3$, wherein M is aluminum, gallium, or indium, each of $R^1$, $R^2$, and $R^3$ independently is Cl, F, I, Br, linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, hydroxy, or carboxyl, wherein each alkyl, alkenyl, alkynyl or alkoxy group independently has up to 12 carbon atoms, wherein each aryl or heteroaryl independently has 5 to 14 ring atoms, wherein any hetero group has at least one hetero atom selected from O, S or N, wherein each alkyl, alkenyl, alkynyl or alkoxy, heterocycloalkyl, heterocycloalkenyl, heterocycloalkynyl, aryl, heteroaryl, aryloxy group can be substituted by 1 up to the highest possible number of halogen atoms, or by at least one electron-donating or electron-withdrawing group, with the proviso that not all three groups $R^1$, $R^2$, and $R^3$ are halogen, hydroxy, or alkoxy; or wherein two of $R^1$, $R^2$, and $R^3$ together with M form a substituted or unsubstituted cyclic group comprising 2 to 5 carbon atoms or 2 to 4 carbon atoms and 1 to 3 hetero atoms selected from O, S or N; and b) continuing the reaction with the same, additional or other monomer component to form a polymer.

The process of the present invention is very versatile, it allows to prepare polymers and copolymers of different monomers. In a first step a monomer component is contacted with an adapted metal compound as catalyst, where the monomer component can comprise only one type of monomers or a mixture or combination of monomers. The polymerization reaction can be continued with the same monomer component, i.e. either enough monomer component is added at the start of the reaction or further monomer component is added during the course of polymerization. It is also possible to add additional monomers or a combination of monomers after the polymerization has started.

Thus, in one embodiment a process for polymerization of a monomer component is provided, using a metal compound as sole catalyst and initiator which comprises the steps:

a) contacting a metal compound $MR^1R^2R^3$, optionally dissolved in an organic solvent, with at least one Michael-type monomer, wherein M is aluminum, gallium or indium, each of $R^1$, $R^2$, and $R^3$ independently is Cl, F, I, Br, linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, nitro, nitroso, hydroxy, or carboxyl, wherein each alkyl, alkenyl, alkynyl or alkoxy group independently has up to 12 carbon atoms, wherein each aryl or heteroaryl independently has 5 to 14 ring atoms, wherein any hetero group has at least one hetero atom selected from O, S or N, wherein each alkyl, alkenyl, alkynyl or alkoxy, heterocycloalkyl, heterocycloalkenyl, heterocycloalkynyl, aryl, heteroaryl, aryloxy group can be substituted by 1 up to the highest possible number of halogen atoms, or at least one electron-donating or electron-withdrawing group, with the proviso that not all three groups $R^1$, $R^2$, and $R^3$ are halogen, hydroxy, or alkoxy; or wherein two of $R_1$, $R^2$, and $R^3$ together with Al form a substituted or unsubstituted cyclic group comprising 2 to 5 carbon atoms or 2 to 4 carbon atoms and 1 to 3 hetero atoms selected from O, S or N;

b) continuing the reaction to form a polymer by reaction with at least one type of a Michael-type monomer.

In general the present invention provides methods for preparing polymers by using specific adapted metal compounds as sole catalyst/initiator. Generally, a metal compound of formula I is contacted with a monomer component, for example comprising Michael-type monomers, wherein the metal compound can either be dissolved in the monomer or in a solvent as described below. Optionally the solution of the metal compound is tempered, i.e. the temperature of the solution is adapted. The polymerization usually starts immediately when a monomer component comprising one or more types of monomers, such as Michael-type monomers and/or heterocyclic monomers, is in contact with the metal compound. The polymerization reaction can be stopped by quenching as is well-known in the art.

The present invention also provides polymers which are obtained by the process of the present invention. Examples for polymers which are useful in the medical field are polyvinylphosphonates, polyvinylsulfonates, polylactones, polylactide, polyglycolide, poly-lactide-glycolide, polycarbonates, and copolymers among others. Those polymers and copolymers can be produced under controlled conditions and with less effort and under environmentally friendly conditions.

Furthermore, the present invention provides a process for preparing a functionalized polymer which comprises contacting $MR^1R^2R^3$, optionally dissolved in an organic solvent, with a monomer component as defined above, to form a polymer, wherein M is aluminum, gallium or indium, each of $R^1$ and $R^2$, is independently Cl, F, I, Br or linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, nitro, nitroso, hydroxy, or carboxyl, wherein each alkyl, alkenyl, alkynyl, or alkoxy independently has up to 12 carbon atoms, wherein each aryl or heteroaryl independently has 5 to 14 ring atoms, wherein any hetero group has at least one hetero atom selected from O, S or N, wherein each alkyl, alkenyl, alkynyl or alkoxy, heterocycloalkyl, heterocycloalkenyl, heterocycloalkynyl, aryl, heteroaryl, aryloxy group can be substituted by 1 up to the highest possible number of halogen atoms; or wherein $R^1$ and, $R^2$, together with M form a substituted or unsubstituted cyclic group comprising 2 to 5 carbon atoms or 2 to 4 carbon atoms and 1 to 3 hetero atoms selected from O, S or N, and wherein $R^3$ is a transferable group carrying at least one functional group.

In a first step in the polymerization process of the present invention one of the catalyst ligands or substitutents, respectively, i.e. a transferable group, is transferred to the monomer and becomes the terminal group of the resulting polymer. This transferred ligand or transferable group can be a group as defined above for $R^1$, $R^2$, and $R^3$. As the transferable group will be the terminal group of the polymer of the present invention, this is an elegant way to provide a desirable group at the end of a polymer. One of the three substitutents of M is transferred, which for a metal compound with three identical groups is one of those and for a metal compound with at least two different or three different substituents might be the one group that for energetic reasons leaves easiest or one having the lowest affinity for the core metal atom, i.e. aluminum, gallium or indium. When the transferable group comprises a reactive or functional entity, this entity can be introduced via the transferable group of the metal compound. Thereby, the polymers in this embodiment are characterized by having a terminal group which comprises a functional group, like an olefinic group, an aromatic group, a heteroaromatic group, an alkynyl group, a mercapto group, a furfuryl group etc., or a chemoactive group, such as alkine or thiol for click reactions, or a bioactive group, such as cholesterin or thiocholesterin for cell-membrane related applications. This makes the polymers even more versatile because the terminal group can be used to introduce different functions, to crosslink polymer chains, to immobilise polymer chains etc. For example, an olefinic terminal group can be used for functionalizing a polymer by click chemistry or thiol-ene chemistry, it also provides a functional group for immobilisation or marking. Polymers with low and/or controlled PDI can be obtained as well as polymers with controlled tacticity.

The present invention also provides functionalized polymers obtained by the process as claimed.

Furthermore, a process for preparing a polymer having increased syndio- or iso-tacticity is provided which comprises contacting $MR^1R^2R^3$, optionally dissolved in an organic solvent, with a monomer component as defined to form a polymer, wherein M is aluminum, gallium or indium, each of $R^1$, $R^2$, and $R^3$, is independently Cl, F, I, Br or linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, nitro, nitroso, hydroxy, or carboxyl, wherein each alkyl, alkenyl, alkynyl, or alkoxy independently has up to 12 carbon atoms, wherein each aryl or heteroaryl independently has 5 to 14 ring atoms, wherein any hetero group has at least one hetero atom selected from O, S or N, wherein each alkyl, alkenyl, alkynyl or alkoxy, heterocycloalkyl, heterocycloalkenyl, heterocycloalkynyl, aryl, heteroaryl, aryloxy group can be substituted by 1 up to the highest possible number of halogen atoms; or wherein two of $R^1$, $R^2$, and $R^3$ together with M form a substituted or unsubstituted cyclic group having 3 to 6 atoms, wherein the cyclic group can comprise at least one further hetero atom selected from O, S or N, and wherein either all three groups $R^1$, $R^2$, and $R^3$ are different or $R^1$ and $R^2$ are the same and $R^3$ is different and is a bulky group.

Further aspects of the present invention are described below in detail.

DEFINITIONS

Figure 1:
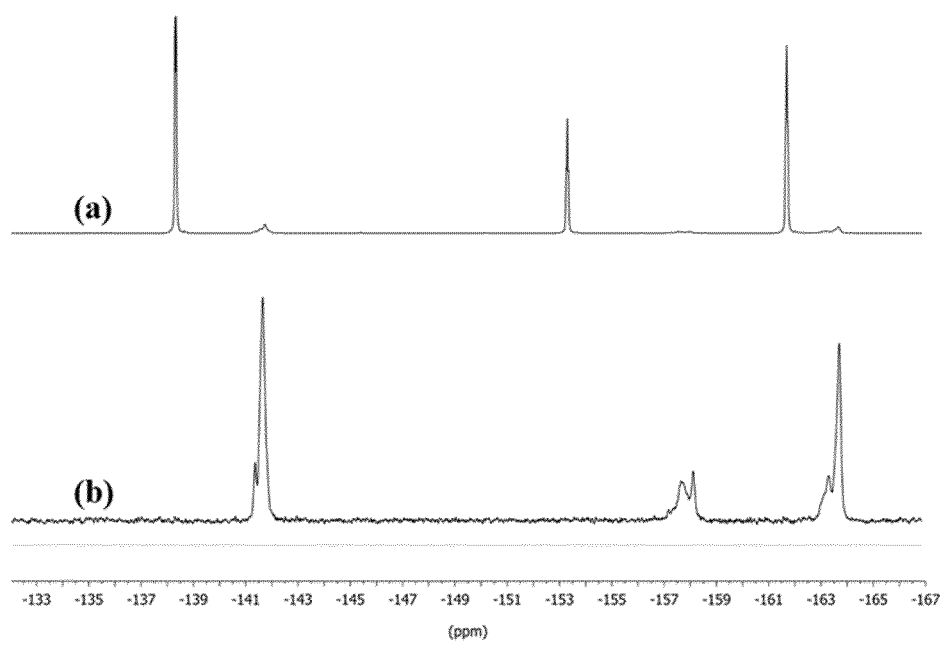
FIG. 1 shows an $^{19}$F-NMR (471 MHz, DMSO) spectrum of precipitated short-chained polyacrylonitrile produced with [Al(C$_6$F$_5$)$_3$]. Recorded with a Bruker AV500CRYO spectrometer. Expansion of the δ−167 to −137 ppm region. (a) NMR sample of the reaction solution, (b) NMR of the same sample after several precipitations.

The term "metal compound" refers to one compound or a mixture of compounds of formula I. The term "used as sole catalyst/initiator" means that only one or more metal compounds of formula I are used as catalyst/initiator. The term "sole catalyst/initiator" indicates that no further type of catalyst or initiator is necessary, in particular no Lewis base. It has been surprisingly found that a metal compound of formula I, as claimed, when used as sole catalyst is active for catalysis and/or initiation of polymerization of demanding monomers even without an α-acidic site.

It was found that the following aluminum compounds are not as active and therefore in one embodiment the metal compound does not comprise the following compounds: diethyl-[(4-methyl-pyridin-2-y)-methyl]aluminum, diethyl-(2-pyridinylmethyl)aluminum, or diethyl(quinolin-2-ylmethyl)aluminum.

The term "Michael-type monomer" refers to a monomer having a vinyl group and conjugated thereto a double or triple bond, such as a carbonyl group or an unsaturated carbon-carbon-bond.

The term "demanding Michael-type monomer" as used in this application refers to Michael-type monomers having a vinylogous system, which have electronically and/or sterically demanding properties, and which may not be polymerizable in good yields and/or high turnover frequencies and/or low PDIs by conventional catalysts. Examples for those demanding Michael-type monomers which can be polymerized with the catalyst/initiator systems and methods of the present invention are vinyl phosphonates, vinyl sulfonates, substituted or unsubstituted acrylamides, substituted or unsubstituted acrylates and methacrylates, like butyl acrylate, isobutyl acrylate, tert.-butyl acrylate, isobornyl acrylate, furfuryl acrylate, glydidyl acrylate, butyl methacrylate, isobutyl methacrylate, tert.-butyl methacrylate, isobornyl methacrylate, furfuryl methacrylate, glydidyl methacrylate, acrylonitrile, and other vinyl ketones, like acrolein and acrolein derivates, substituted or unsubstituted heteroaromatic monomers, like vinyl pyridine, oxazolines, among others.

The term "polymer" comprises any type of polymer, i.e. homopolymer, copolymer, terpolymer etc. In particular shall the term polymer refer to polymers that are comprised of one or more type of monomers as defined in this application and in the claims.

The term "bulky" refers to groups of formula I that are sterically and/or electronically encumbering, i.e. sterically hindering. Examples are tert.-butyl, substituted aryl or heteroaryl groups.

The term "precision polymerization" when used in this application refers to polymerization of Michael-type monomers by using the catalyst and initiator of the present invention. This allows polymerization of monomers which are difficult or not (i.e. in a non-controllable manner) to polymerize by conventional anionic polymerization methods or radical polymerization methods. Furthermore this term relates to polymerization processes with a sufficient TOF i.e. short reaction time, which provide polymers with low polydispersity index, high yields, and with controllable molecular weight and tacticity.

The term "tactic" or "tacticity", respectively, includes syndiotacticity and isotacticity.

"Increased syndio- or isotacticity" means that the percentage of syndio- or isotacticity is increased compared to average, by at least about 10%, in particular at least about 25% and preferably by at least about 40%.

The term "catalyst and initiator" characterizes metal compounds of formula I which are active as initiators as well as catalysts for polymerization. The terms "catalyst and initiator" and "catalyst" are used interchangeably, as a catalyst of the present invention also has the function of an initiator.

The term "monomer component" defines a component comprising the monomers to be polymerized with the catalyst or the process, respectively, of the present invention. The monomer component of the present invention comprises at least one Michael-type monomer and/or at least one heterocyclic monomer and/or a combination of carbondioxide and a heterocyclic monomer as defined in the claims and can comprise a mixture of monomers of different types, such as a mixture of different Michael-type monomers, a mixture of different types of heterocyclic monomers, a mixture of one or more Michael-type monomers and one or more heterocyclic monomers and a mixture of these monomers with carbon dioxide.

The term "monomer" or "type of monomer" refers the class of monomers, not to a single molecule, except the context says otherwise. Thus, when "a monomer" is contacted with a catalyst this means that a suitable amount of the type of monomer mentioned is contacted with the catalyst.

Groups like alkyl, alkenyl, alkynyl, or alkoxy, heterocycloalkyl, heterocycloalkenyl, heterocycloalkynyl, aryl, heteroaryl, can be substituted or unsubstituted and substituents can be present up to the highest possible number, as long as the compounds retain the necessary properties.

The term "substituted" when used in connection with groups like alkyl, alkenyl, alkynyl, or alkoxy, heterocycloalkyl, heterocycloalkenyl, heterocycloalkynyl, aryl, heteroaryl, or acrylate or methacrylate, indicates that such a group is substituted by at least one substituent and up to the highest possible number of substituents, where the substituents are selected from linear, branched, or cyclic alkyl, alkenyl, alkynyl groups having up to 6 carbon atoms, linear, branched, or cyclic alkoxy groups having up to 6 carbon atoms, halogen, metallocenyl, nitro, nitroso, hydroxy, carboxyl, or aryl, such as phenyl or naphthyl, or heteroaryl.

The term "substituted by halogen" when used in connection with carbon containing groups refers to partially or fully halogenated, such as perfluorinated groups. The term "wherein each alkyl, alkenyl, alkynyl, or alkoxy, heterocycloalkyl, heterocycloalkenyl, heterocycloalkynyl, aryl, heteroaryl, aryloxy group can be substituted by 1 up to the highest possible number of halogen atoms" refers to such groups that can carry only one halogen, in particular chlorine, fluorine or bromine, or more halogen atoms. Any possible number of halogen atoms can be present on a group and the "highest possible number of halogen atoms" refers to groups wherein each hydrogen has been replaced by a halogen atom, in other words that are perhalogenated.

The term "donor substituted" refers to substituents that can add to an electronic system, for example a π system or sigma system, such as R, OR, SR, $NR_2$, wherein R is linear or branched alkyl, such as methyl, ethyl, isopropyl, isobutyl, butyl, tert.-butyl, aryl, or heteroaryl as defined above.

The terms "electron-donating" or "electron-withdrawing" group refer to groups that either are donors or acceptors of electrons or can add to or reduce an electronic system. Electron-donating or electron-withdrawing groups are well-known to the skilled person.

The term "with the proviso that not all three groups $R^1$, $R^2$, and $R^3$ are halogen, hydroxy, or alkoxy;" refers to those compounds where $R^1$, $R^2$, and $R^3$ are identical and, thus excludes $MHal_3$, $M(OH)_3$ and $M(OX)_3$ as catalysts of the present invention.

When for a metal compound two of $R^1$, $R^2$, and $R^3$ together with M form a substituted or unsubstituted cyclic group having 3 to 6 atoms this cyclic group in addition to metal comprises either only carbon atoms or carbon and hetero atoms selected from O, S or N. In other words the cyclic group comprises metal and 2 to 5 carbon atoms or 2 to 4 carbon atoms and 1 to 3 hetero atoms. One example is a glycol group where both oxygen atoms are bound to the metal, such aluminum.

The term "luminescent" when used in the present description refers to a property of a compound to emit visible light after energetic excitation. The energetic excitation can be via UV light, electronically, chemically or by other energetic sources known to the person skilled in the art. Luminescence comprises emission of light in all visible colors. The term "luminescence" includes fluorescence, phosphorescence or other mechanisms of visible light emission.

A "luminescent component" is a molecule that has luminescence or can be induced to be luminescent. A luminescent component can be an adduct of a metal compound of the present invention and a monomer, where the luminescent part can be contributed by a ligand of the metal compound or by a monomer, or it can be an oligomer or polymer with a luminescent unit, which has been obtained by using the metal compound and the monomer component of the present invention.

The terms "luminescent unit", "luminescent element" and "luminescent group" are used interchangeable and refer to groups that contribute to luminescence in a molecule. All of those can be part of the luminescent component.

DESCRIPTION OF THE INVENTION

The present invention is concerned with a system of a metal compound that is active as catalyst and a monomer component for polymerization. In particular the present invention is concerned with an adapted pair of a catalyst and a monomer component. In one embodiment a metal compound of the present invention that is active for polymerization of Michael-type monomers as sole catalyst and initiator is a metal compound $MR^1R^2R^3$, wherein M is aluminum, gallium or indium, each of $R^1$, $R^2$, and $R^3$ independently is Cl, F, I, Br, linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, nitro, nitroso, hydroxy, or carboxyl, wherein each alkyl, alkenyl, alkynyl or alkoxy group independently has up to 12 carbon atoms, wherein each aryl or heteroaryl independently has 5 to 14 ring atoms, wherein any hetero group has at least one hetero atom selected from O, S or N, wherein each alkyl, alkenyl, alkynyl or alkoxy, heterocycloalkyl, heterocycloalkenyl, heterocycloalkynyl, aryl, heteroaryl, aryloxy group can be substituted by 1 up to the highest possible number of halogen atoms, or at least one electron-donating or electron-withdrawing group; with the proviso that not all three groups $R^1$, $R^2$, and $R^3$ are halogen, hydroxy, or alkoxy; or wherein two of $R^1$, $R^2$, and $R^3$ together with M form a substituted or unsubstituted cyclic group comprising 2 to 5 carbon atoms or 2 to 4 carbon atoms and 1 to 3 hetero atoms selected from O, S or N.

The first step, when it is intended to polymerize a monomer, is to assess the electrophilicity or nucleophilicity, respectively, of the one or more monomers to be polymerized and then to choose a suitable catalyst. It has been found that the catalyst has to be adapted with regard to its activity. Michael-type monomers can have a broad range of electric properties. For the sake of simplicity Michael-type monomers can be classified in three groups:

Group A: monomer with electron deficiency or high electrophilicity
   Examples are vinylpyridine, acrylonitrile;
Group B: monomers having medium electrophilicity
   Examples are oxazolines, acrylates, acrylate esters methacrylates, methacrylate esters; and
Group C: monomers having low electrophilicity or electron-rich monomers
   Examples are acrylamides, vinylphosphonates, vinylsulfonates.

Heterocyclic monomers as defined in the claims, such as lactones, lactams, oxiranes, aziridines, azetidines, lactides, and glycolides, usually have medium to low electrophilicity.

Catalysts that are active for the polymerization of the monomer component of the present invention, such as Michael-type monomers, can be found based on a classification in the above groups, i.e. based on the electrophilicity of the monomer. It seems that by combining a Michael-type monomer with an adapted catalyst, where the adaption can be done as described below, provides activation energy such that even very difficult to polymerize monomers can form polymers, such as vinyl sulfonates or vinyl phosphonates, vinyl pyridines or vinyl based monomers with substitution at the α site.

The evaluation of those parameters that influence the catalytic activity of the applied metal compound and the reactivity of the applied monomers can be achieved by using methods and values disclosed in the prior art. The gist of the present invention is the use of parameters that were known, but were used in other fields or for other reactions. It was found by the inventors, that on the one hand electrophilicity of a monomer and on the other hand affinity for fluoride ions of the metal compounds of formula I are useful parameters to determine a pair of monomer/catalyst that allows optimal polymerization.

Thus, it was found that for the monomer reactivity towards the Group Transfer Polymerization (GTP) is a useful parameter. Methods to determine reactivity towards GTP have been described in the literature and scales have been established for the polymerization via rare earth metal-based catalysts. These methods can be used to classify monomers in groups A, B, or C as outlined below. In the below mentioned documents it is shown that coordination strength of the monomers towards a metal center can be determined via NMR experiments as well as copolymerization experiments. The reactivity of some common Michael-type monomers correlates with their coordination strength towards a metal center as well as with their $pK_a$ values in the following order:

2VP<iPOx<Methacrylates<Acrylates< Acrylamides<Vinylphosphonates Vinylsulfonates (See Salzinger, Stephan. *Expansion of Rare Earth Metal-Mediated Group Transfer Polymerization to New Monomers*. Diss. Technische Universität München, 2013. (P. 218); Soller, Benedikt. *Rare Earth Metal-Mediated Group Transfer Polymerization of Vinylphosphonates: Initiation, Propagation, and Stereoregularity*. Technische Universität München, Diss. Technische Universität Munchen, 2016; Soller, Benedikt S., Stephan Salzinger, and Bernhard Rieger. "Rare Earth Metal-Mediated Precision Polymerization of Vinylphosphonates and Conjugated Nitrogen-Containing Vinyl Monomers." *Chemical reviews* 116.4 (2015): 1993-2022; Zhang, Ning, et al. "Rare earth metal-mediated group-transfer polymerization: from defined polymer microstructures to high-precision nano-scaled objects." *Journal of the American Chemical Society* 135.24 (2013): 8810-8813.)

Thus, monomers can be classified as monomers of Group A (as defined above), that are weakly coordinating monomers with a low reactivity towards a GTP; as monomers of Group B (as defined above), that have a low to medium reactivity and coordination; or as monomers of group C (as defined above), that are very reactive and strongly coordinating monomers.

It was found that ring type monomers or heterocyclic monomers, respectively as used in the present invention, such as lactone, lactam, substituted dione, oxirane, aziridine and azetidine, can be classified as medium to strong reactive and that a catalyst having medium to low activity, as defined below, has the best activity to provide for the ring opening and the polymerization.

The monomer component comprises either only one type of monomer or a mixture of monomers. If a mixture of monomers is used, the catalyst is adapted to one of those, for example the first monomer that is added or the monomer with the best suited electrophilicity, As outlined above the monomer component can comprise at least one Michael-type monomer, and/or at least one type of monomer selected from a group comprising at least one lactone which can have up to 9 ring atoms, preferably up to 7 ring atoms and which can be substituted or unsubstituted; a lactam having up to 9 ring atoms, preferably up to 7 ring atoms which can be substituted or unsubstituted; or an 1,4-dioxan-2,4-dione which can be substituted or unsubstituted, and/or a combination of carbon dioxide and at least one monomer selected from oxiranes, azetidine, and aziridine. It is also possible to have a mixture of two or three of these monomers or of at least one of these monomers with other monomers.

Lactones are well-known. Examples are ε-caprolactone, α- or β-butyrolactone. These monomers are of particular interest because they result when polymerized in polymers that are biodegradable.

Methods for polymerizing lactones are known. However, for their polymerization either a combination of a Lewis acid and a Lewis base has to be used and/or the addition of an initiator, which is benzyl alcohol has to be used. Although a method for polymerizing lactones by using only an aluminum compound has been described, this cannot be used as after long reaction time only polymers with broad PDI can be obtained.

Lactams are also well-known and result in polymers having very valuable properties. Examples for lactams that can be polymerized with a catalyst of the present invention are substituted or unsubstituted caprolactam, such as ε-caprolactam or N-vinylcaprolactam.

A further group of monomers that result in polymers having desirable properties are polymers obtained from dioxan-diones, in particular lactides and glycolides or copolymers from lactide and glycolide. Lactide, glycolide, or lactide/glycolide polymers are biodegradable and are degraded in the human body with a predeterminable degradation rate. Therefore, this type of polymers is used for sutures, implants and delivery devices.

The other useful parameter for finding a pair of monomer and catalyst is fluoride ion affinity index (FIA) which is used for the quantification of Lewis acidity. Although methods to determine acidity are well-known, these are not applicable to determine Lewis acidity, in particular for sterically demanding compounds. It was found that there is a good correlation between fluoride ion affinity of a compound, i.e. energy released upon the coordination of a fluoride ion to a Lewis acid center in kJ/mol and Lewis acidity. Therefore, high FIA values represent a strong Lewis acidic center. (see Haartz, J.; McDaniel, D. H. *J. Am. Chem. Soc.* 1973, 95, 8562; Larson, J.; McMahon, T. *J. Am. Chem. Soc.* 1985, 107, 766; Müller, L. O.; Himmel, D.; Stauffer, J.; Steinfeld, G.; Slattery, J.; Santiso-Quiñones, G.; Brecht, V.; Krossing, I. *Angew. Chem., Int. Ed.* 2008, 47, 7659.)

Ingo Krossing and others developed a method to determine the fluoride affinity index for Lewis acids. The FIA is an indicator for the acidity of the Lewis acid. It is known inter alia from N. Bartlett et al. (Inorg. Chem. 1984, 23, 3167-3173) that the fluoride ion affinity (FIA) is a reliable measure of the Lewis acidity, combining the strength of a Lewis acid $A_{(g)}$ with the energy that is released upon binding a fluoride ion $F^-$:

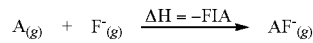

The higher the FIA of the parent Lewis acid A, the more stable it is towards decomposition on thermodynamic grounds. The simplest and most general access to reliable FIA values comprises the use of quantum chemical calculations in isodesmic reactions. The following table 1 shows calculated FIAs of a representative set of strong neutral Lewis acids.

TABLE 1

| Lewis acid/anion | FIA |
| --- | --- |
| $Al(OR^F)_3/[FAl(OR^F)_3]^-$ | 537 |
| $Al(C_6F_5)_3/[FAl(C_6F_5)_3]^-$ | 530 |
| $AlI_3/[FAlI_3]^-$ and $AlBr_3/[FAlBr_3]$ | 393 |

The first compound in table 1 is too strong to be active as catalyst. The second compound, trispentafluorophenylaluminum ($Al(C_6F_5)_3$) having a high FIA of 530 is very strong and readily polymerizes monomers of group A. On the other hand, $AlCl_3$, $AlI_3$ and $AlBr_3$ are very weak Lewis acids and do not polymerize any of the tested monomers. Thus, a suitable catalyst has a FIA of 530 down to more than 393.

Metal compounds having a FIA in the range of 530 or below but not higher than 530 are suitable for polymerization of monomers of group A, those having a FIA in the medium range are suitable for monomers of group B, and those having a FIA of higher than 393 are suitable for monomers of group C.

To confirm the above explanations experiments were carried out and the results showing the polymerization activity of monomers and catalysts are summarized in table 2. For example, polyacrylonitrile can be synthesized with extreme turnover frequencies (TOF) in high yields within a short timescale by the use of trispentafluorophenylaluminum ($Al(C_6F_5)_3$) as catalyst. (see table 2, exp. 1). Fluorine endgroups could be revealed through $^{19}$F-NMR, which implies that one of the catalyst ligands has been transferred to the polymer chain end as previously mentioned (FIG. 1). If triphenylaluminum ($Al(C_6H_5)_3$) is used as catalyst for polyacrylonitrile, no polymerization can be observed, because its FIA, and thereby the Lewis acidity of this catalyst is not sufficient for the polymerization of monomers of group A due to the missing electron-withdrawing groups, e.g. fluoride groups (see table 2, exp. 2).

While trispentafluorophenylaluminum ($Al(C_6F_5)_3$) is a suitable catalyst for the polymerisation of the less reactive and weakly coordinating monomers of group A, no polymerization can be observed when the same catalyst is applied for the polymerization of monomers of group B or C. Without being bound by theory, it is assumed that the Lewis acidity as shown by the high FIA of this catalyst is too strong for the polymerization of the more reactive monomers of group B. In fact, the use of the less acidic triphenylaluminum ($Al(C_6H_5)_3$) results in a successful polymerization of those monomers (see table 2, exp. 3).

The same correlation can be observed when the Lewis acidity of the applied catalyst has a FIA in the medium range, i.e. well below 530 but also well above 393. Attempts to polymerize monomers of group B with less acidic Lewis acids such as triethylaluminum ($Al(C_2H_5)_3$) or triisobutylaluminum ($Al(C_4H_9)_3$) failed, confirming the above-mentioned assumption (table 2, exp. 4-5). In contrast to this, these catalysts perform well in the polymerization of monomers of group C. Triethylaluminum ($Al(C_2H_5)_3$) and triisobutylaluminum ($Al(C_4H_9)_3$) as well as trioctylaluminum ($Al(C_8H_{17})_3$) polymerize monomers of group C such as dimethylacrylamide (table 2, exp. 6-8). Less acidic Lewis acids such as aluminumbromide (FIA: 393) and aluminumiodide (FIA: 393) are not active catalysts for the polymerization of the reactive and strongly coordinating monomers of group C, due to their low FIA (table 2, exp. 9-10)

In summary, according to the present invention it is possible to identify suitable catalysts for polymerisation of demanding Michael-type monomers with these two useful parameters according to the following approach:

Monomers of group A with a low reactivity and coordination strength need very strong Lewis acids with a high FIA in order to be successfully polymerized.

Monomers of group C, on the other hand, i.e. highly reactive and coordinating monomers, do not require strong Lewis acids, and can therefore be polymerized by using weak Lewis acids, with a low FIA.

Monomers of group B, i.e. with medium reactivity and coordination strength can be polymerized with Lewis acids having medium acidity.

The critical point is that monomer and catalyst have to be adapted. If an electron-poor monomer shall be polymerized like acrylonitrile, a Lewis acid having a high fluoride affinity index has to be used. If an electron-rich monomer is polymerized, a Lewis acid having a low fluoride affinity index is used. For monomers that have a "medium" electron density a Lewis acid having a medium fluoride affinity index is used.

Table 2 shows selected combinations of Lewis acids having different acidity and their suitability towards the GTP of various Michael-type monomers. For a better comparability, the reaction time has been kept constant. Quantitative Yields would have been achieved by extending the reaction time. The examples describe further combinations and conditions.

TABLE 2

| Exp. | Mon. | LA | t[s] | Mon./LA | $M_n^{[b]}$ | Đ | Y [%][c] |
|---|---|---|---|---|---|---|---|
| 1 | AcN | $Al(C_6F_5)_3$ | 30 | 1000 | 350 | n.d. | 74 |
| 2 | tBuMA | $Al(C_6F_5)_3$ | 3600 | 100 | — | — | 0 |
| 3 | tBuMA | $Al(C_6H_5)_3$ | 3600 | 100 | 23 | 1.06 | 62 |
| 4 | tBuMA | $Al(C_2H_5)_3$ | 3600 | 100 | — | — | 0 |
| 5 | tBuMA | $Al(C_4H_9)_3$ | 3600 | 100 | — | — | 0 |
| 6 | DMAA | $Al(C_2H_5)_3$ | 3600 | 100 | 235 | 1.52 | 57 |
| 7 | DMAA | $Al(C_4H_9)_3$ | 3600 | 100 | 20 | 1.35 | 80 |
| 8 | DEVP | $Al(C_8H_{17})_3$ | 3600 | 100 | n.d. | n.d. | 70 |
| 9 | DEVP | $AlBr_3$ | 3600 | 100 | — | — | 0 |
| 10 | DEVP | $Al(I)_3$ | 3600 | 100 | — | — | 0 |

[a] Exp 1: total solvent volume 7.0 mL (solvent N,N-dimethylformamide),] Exp 2-10: total solvent volume 2.0 mL (solvent Toluene) T = 60° C. (exept Exp 1 = RT)
[b]determined by GPC coupled with multi angle laser light scattering (MALS), reported in $10^3$ g/mol,
[c]yield measured gravimetrically and by $^1$H NMR spectroscopy.

In summary, strong Al(III)-based Lewis acid catalysts are suitable for the polymerization of monomers of the group A, while they are not suitable for monomers of the other groups due to their high Lewis acidity. Weaker Lewis acids are required for the polymerization of monomers of the group B and C. Monomers of the group C require the lowest Lewis acidity and FIA in order to be successfully polymerized. The classification for the groups A, B, C is not strict and catalysts can be found that are useful in an overlapping range. Therefore, it might be possible to polymerize some monomers classified for group C with Lewis Acids found suitable for group B, in particular when the electrophilicity of the monomer is close to that of monomers of group B.

With these parameters being defined, an approach for a polymerization of monomers by the method of the present invention can be as follows:

At first, it is determined whether a monomer belongs to group A, B or C, either by comparison with known monomers or by its reactivity.

At second, a catalyst with an adequate FIA/Lewis acidity is chosen. If the monomer has been assigned to Group A, a catalyst with a strong Lewis acidity and high FIA is applied. If a monomer has been assigned to Group B a catalyst with a weaker Lewis acidity and lower FIA is chosen. If a monomer belongs to group C a catalyst with a low Lewis acidity is selected.

To evaluate if the two components of the system—cataylst and monomer—are suitable, the polymerization activity can be tested. Any method for testing polymerization can be used, and the results of different runs are compared. In one embodiment, a catalyst is tested as follows: a metal compound of formula I is combined with a monomer for polymerization in a ratio of catalyst to monomer of 1:100 in an organic solvent, such as N,N-dimethyl formamide, at a temperature of 40° C. for 60 min. These conditions have been found useful for testing, but other conditions can be used as well, as long as the same conditions are used for comparison.

Copolymers of the above mentioned monomers can be either random copolymers or block copolymers. The optimal ratios and conditions can be found with routine experiments by the skilled person.

One advantage of the system of the present invention resides in the fact that no initiator or co-catalyst is necessary. It was found that with known methods, where benzyl alcohol is used as initiator, inevitably one molecule benzyl alcohol is found at the chain end of each polymer chain. This is due to the reaction mechanism, where as a first step the initiator is added to the activated site of the first monomer to be polymerized.

In contrast thereto, the method of the present invention allows to choose the group that starts the reaction and, thus, will be present as end group in the final polymer chain. Whether a Michael-type monomer or a heterocyclic monomer is used for polymerization, the reaction will start by coordination of a ligand of the metal compound and the monomer thereby activating the monomer. This activation either results in an activated site on the Michael-type monomer or a ring opening reaction for the heterocyclic monomer. In both cases polymerization then continues from the created active sites which coordinate with the next monomer.

A further subject of the present invention is a ring opening polymerization of copolymers derived from carbon dioxide and a comonomer which is selected from substituted or unsubstituted oxirane with 3 or 4 ring atoms or a substituted or unsubstituted aziridine or azetidine. It was found that polycarbonate copolymers can be obtained with a ring opening polymerization when using the catalysts of the present invention. In other words, a metal compound as defined in this application when used as sole catalyst and initiator is active enough to initiate the polymerization between carbon dioxide and at least one of the above-mentioned monomers.

When using a catalyst of the present invention with adapted activity, polymers with high polymer weight, low dispersion rate can be obtained from the above mentioned monomers in short time and at relatively low temperatures. With an adapted pair of monomer and catalyst high turnover rates can be obtained in an hour or less, such as within 30 minutes or even less, such as 10 minutes.

Generally, the process can be carried out in a broad temperature range, within −78° C. to 150° C. This is particularly useful, as polymerizations can be carried out at room temperature or shortly below or above which facilitates the reaction. Moreover, temperature is one parameter to adapt the reaction condition such that the desired polymer is obtained. The skilled person can find the optimal conditions by routine experiments.

After the reaction has been terminated by the addition of a quenching reagent such as an alcohol the polymer is precipitated in an organic solvent and fully characterized via common analytical techniques. In the examples this method is also described. Some results of this method are shown in FIGS. 1-11 and in tables 2, 4, and 5.

If the yield of the polymer as well as the initiator efficient of the reaction (expected molecular mass ($M_{n(exp)}$/detected molecular mass $M_{n(det)}$) are satisfactory (>50%) the chosen catalyst is suitable for the polymerization of this monomer. If the measured values are not satisfactory a Lewis acid with another Lewis acidity and FIA is chosen and the step is repeated.

In the following table 3 useful combinations of pairs of monomer and catalyst are summarized. This table is a general guideline. When looking for another suitable pair it is useful to assess the monomer to one of groups A, B, and C and then select a catalyst based on the above explained rules or based on the following table 3.

Table 3 shows examples of Lewis acids and their suitability for the polymerization of exemplary Michael-type Monomers of the previously defined groups A, B and C.

TABLE 3

| | Group A | | Group B | | | | | Group C |
|---|---|---|---|---|---|---|---|---|
| | AcN | 4-VP | ipOx | MMA | tBuMA | EA | tBuA | DMAA |
| $Al(C_6F_5)_3$ | X | X | — | — | — | — | — | — |
| $Al(C_6H_5)_3$ | — | — | X | X | X | X | X | X |
| $Al(CH_3)_2(SC_6H_5)$ | — | — | — | X | X | X | X | X |
| $Al(CH_3)_2(OC_6H_5)$ | — | — | — | X | X | X | X | X |
| $Al(C_4H_9)_3$ | — | — | — | — | — | — | X | X |
| $Al(C_2H_5)_3$ | — | — | — | — | — | — | X | X |
| $Al(CH_3)_3$ | — | — | — | — | — | — | X | X |

$V_{solvent}$ = 2 mL, T = 40° C., t = 60 min.

If an electron deficient monomer like acrylonitrile is combined with a metal compound having low acidity, like triphenylaluminum, no reaction takes place. If an electron-rich monomer like DMAA is reacted with a highly acid metal compound like aluminumtriperfluorophenyl no polymerization takes place. With the knowledge of the present invention it is possible to find the best suited catalyst and/or to fine-tune the system.

When a pair of monomer and metal compound has been found, the reactivity in polymerization is tested as outlined above. If the reactivity is not sufficient, the metal compound can be adapted. If the acidity of the metal compound is too high, at least one of $R^1$, $R^2$, and $R^3$ should be substituted by an electron donating group. If the metal compound is too active, at least one of $R^1$, $R^2$ and $R^3$, should be substituted by an electron withdrawing group.

Some useful compounds of formula I are shown in the following:

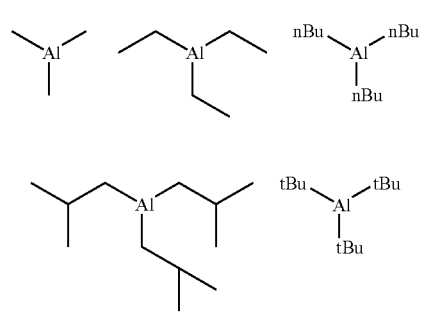

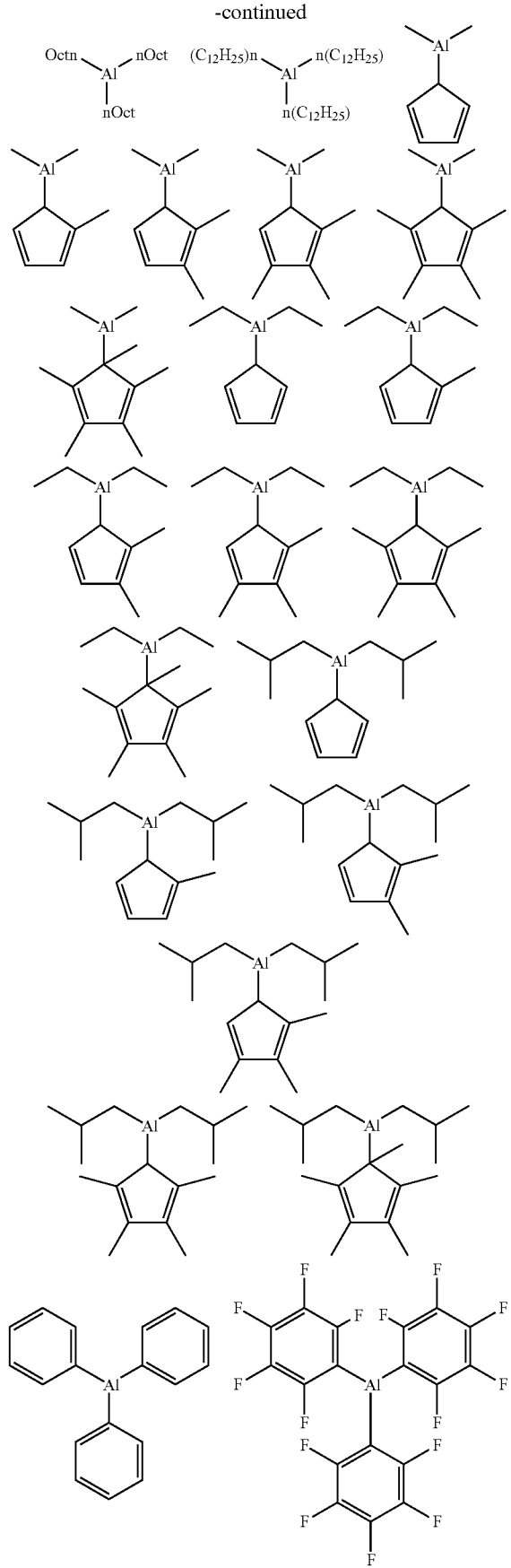
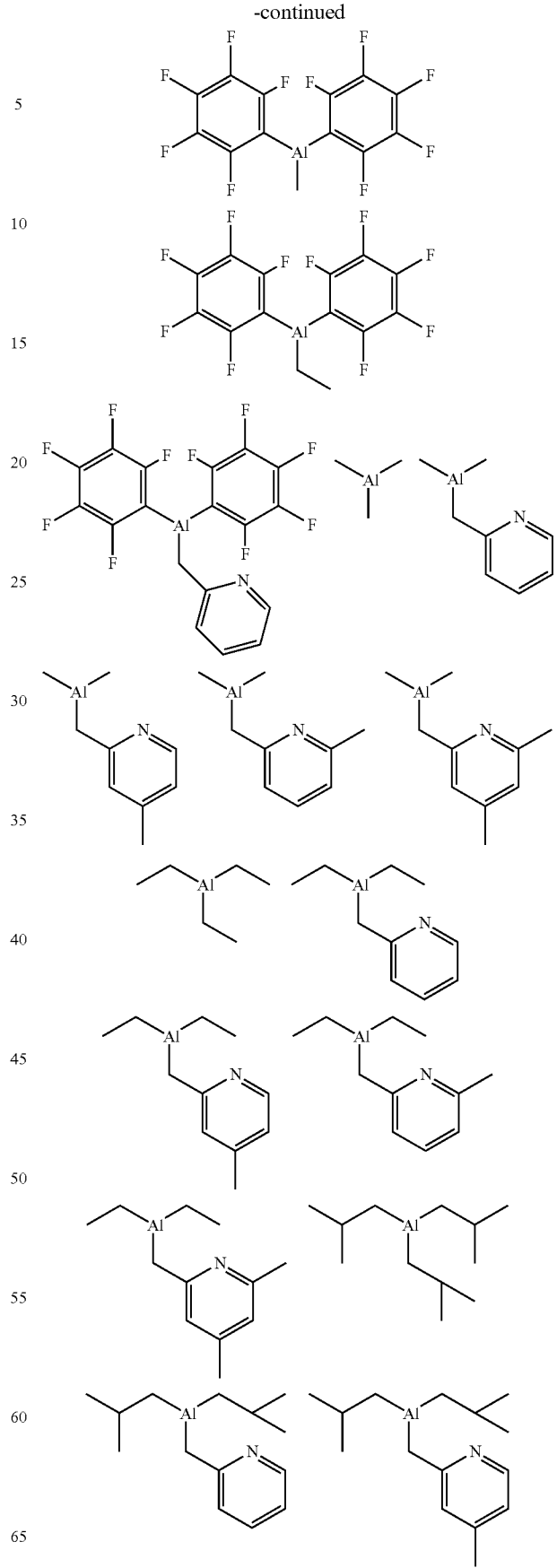

-continued
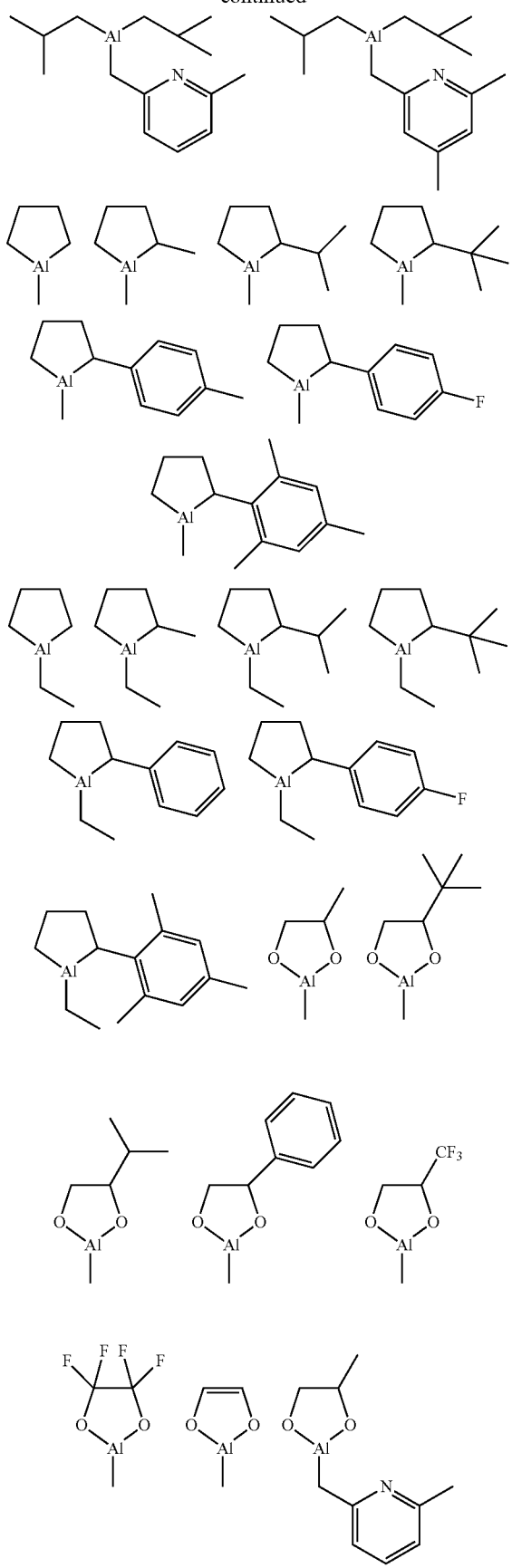
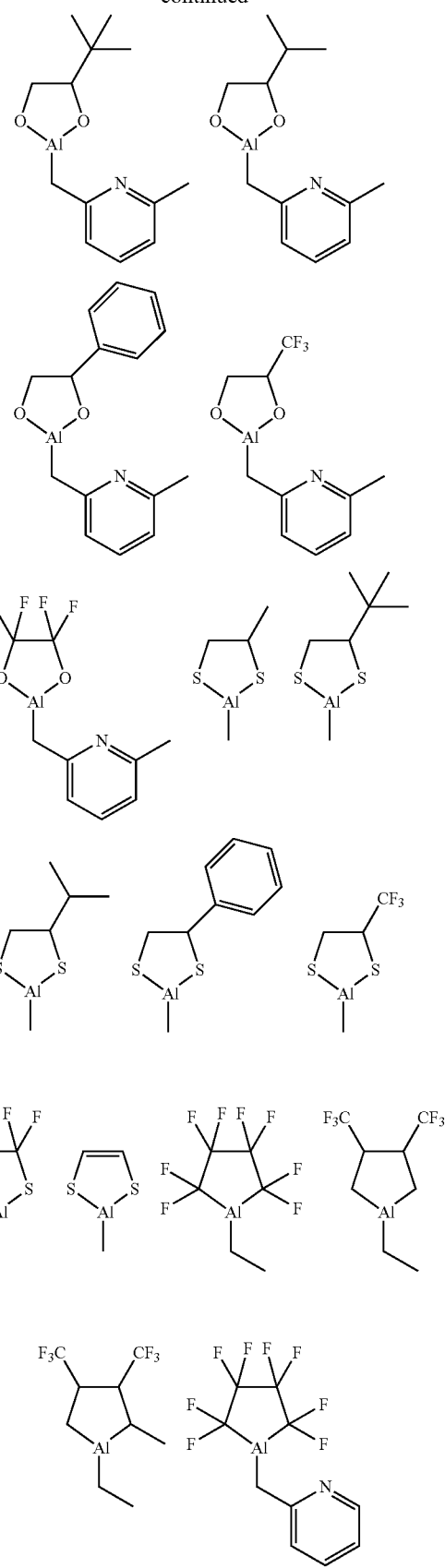

-continued
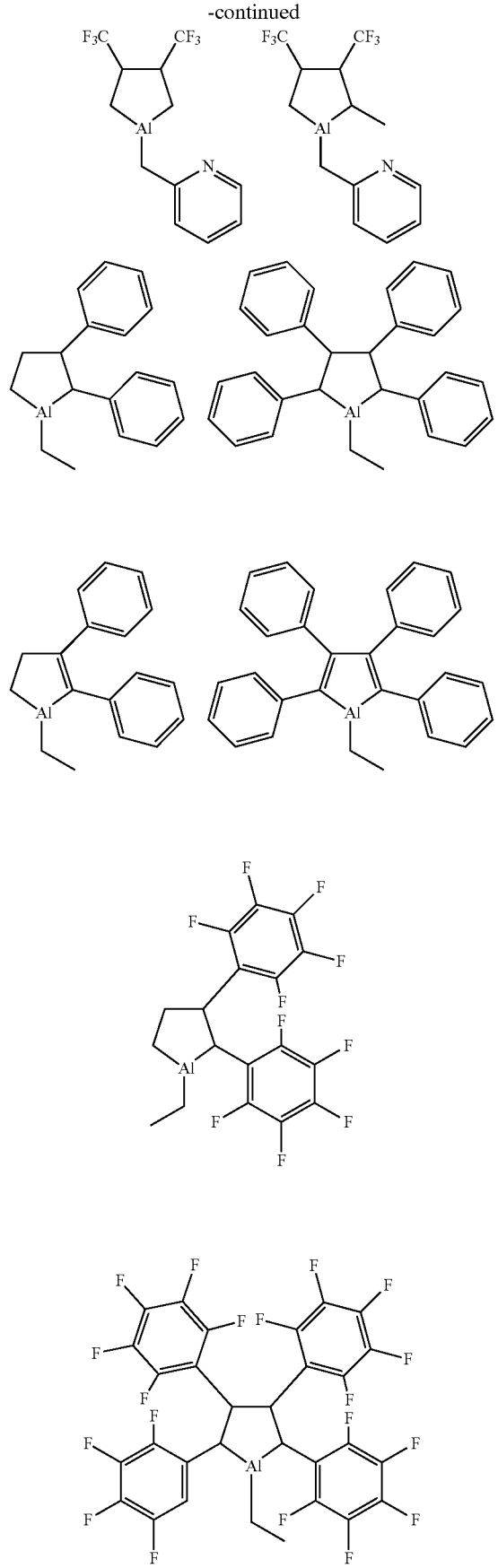
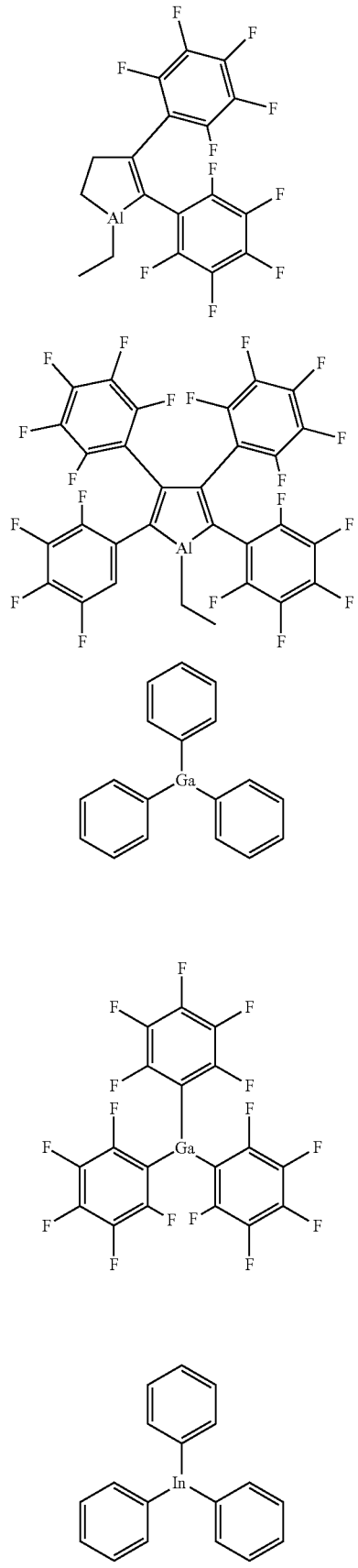

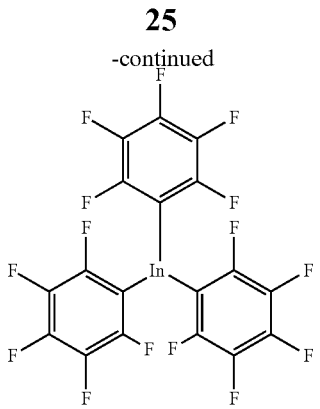

Metal compounds of formula I are either commercially available or can be prepared with known methods with commercially available products. One common technique is to contact commercially available chlorinated metal precursors such as chloro-dialkyl-aluminates and a potassium salt bearing the desired group, for example, pentamethylcyclopentadiene potassium which yields the desired aluminum compound. An example for a synthesis is shown in Scheme 1

Scheme 1

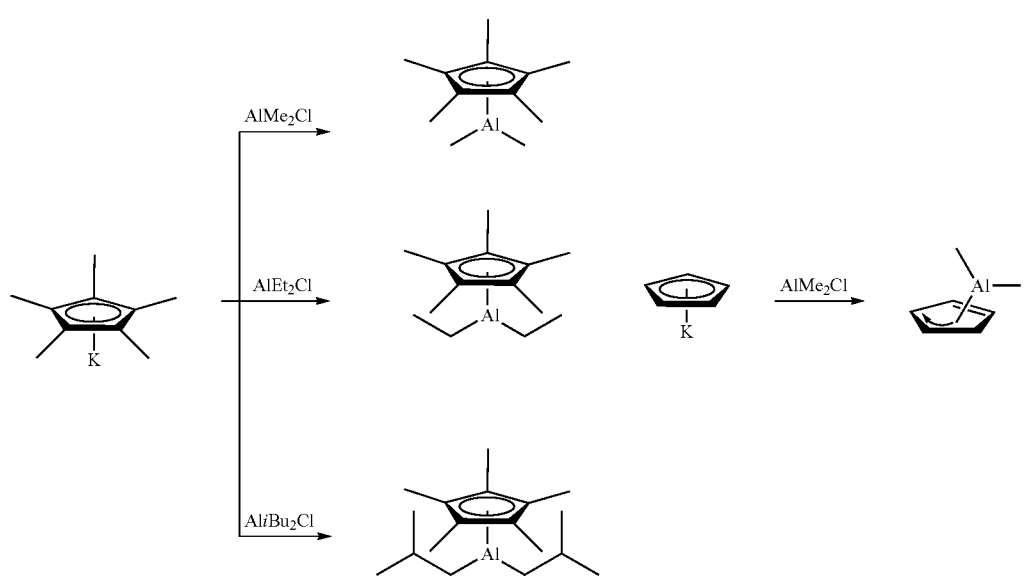

The metal compounds of formula I are active as catalyst and initiator. Without being bound by theory, it is assumed that monomer and catalyst/initiator of the present invention react according to the following mechanism as shown in Scheme 2 (with aluminum as example):

Scheme 2

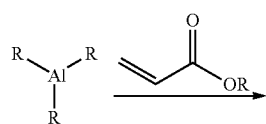

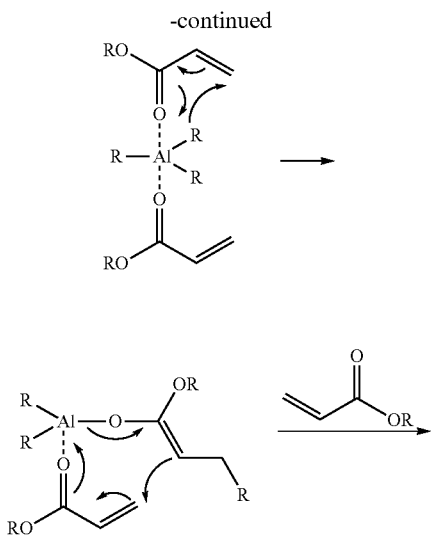

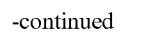

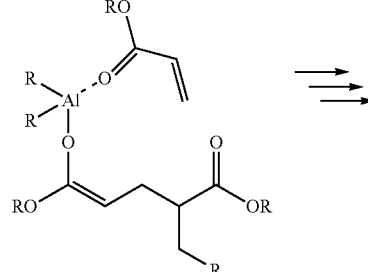

The residues $R^1$, $R^2$ and $R^3$ of the aluminum compound used as catalyst and initiator have an influence on the acidity and residues can be selected in each case for adjusting the Lewis acid strength. This means, if one or more of the groups $R^1$, $R^2$ and $R^3$ are electron withdrawing groups (EWG), the Lewis acidity is increased, vice versa the Lewis acidity is decreased if $R^1$ and/or $R^2$ are electron donating groups. Therefore, the Lewis acidity can be adjusted and fine-tuned accordingly to the chemical polymerization requirements of a specific type of Michael-type monomer used. As an example, at least one of $R^1$ and $R^2$ can be an EWG like a fluorinated or perfluorinated alkyl or aryl, such as $CF_3$, $CF_2CF_3$, $C_6F_5$, or an electron donating group like alkyl or cycloalkyl, such as methyl, ethyl, propyl, isopropyl, butyl, isobutyl, tert.-butyl, neopentyl, octyl, phenyl, cyclopentadienyl, tetramethyl-cyclopentadienyl, pentamethyl-cyclopentadienyl.

Furthermore, $R^1$, $R^2$ and $R^3$ can have an influence on the steric interaction between the catalyst and initiator compound and the monomer which can also control tacticity It has been found that syndiotacticity can be increased, for example by at least 10%, in particular by at least 25% and preferably by at least 40%, by increasing the size of substituents at the core metal atom, i.e. at least one of $R^1$, $R^2$ and $R^3$. When an asymmetric metal compound with at least one bulky group is used as catalyst for polymerizing dimethyl acrylamide syndiotacticity of the polymer obtained can be in the range of up to more than 80%, whereas when using a symmetric metal compound in particular one with small substitutents usually an atactic polymer is obtained.

The use of the catalytic and initiator compounds of the present invention provides for kinetic advantages and results in higher turnover frequencies of up to 10,000 or even more, such as 50,000 to 100,000. Furthermore, it was found that catalyst activity, polymer yield, molecular mass of the final polymer and polydispersity index are dependent from the molar ratio of monomer to catalyst system, in other words the catalyst loading. It was found, that a high catalyst loading, i.e. a molar ratio of monomer/catalyst of less than 1000 results in a high yield, nearly stoichiometric monomer consumption and a low molecular mass. Thus, the molar ratio of monomer/catalyst system can for example be in a range of 1:0.5 to 2000:1, such as 1:1 to 1000:1.

As outlined above many types of monomers can be polymerized with the system and the method of the present invention. Examples of demanding Michael-type monomers that can be polymerized in high yield, with high TOF and with interesting properties are vinylphosphonates, in particular diethylvinylphosphonate, or diisopropylvinylphosphonate; vinylsulfonates; substituted or unsubstituted acrylates and methacrylates, such as methylacrylate, butyl acrylate, isobutyl acrylate, tert.-butyl acrylate, isobornyl acrylate, furfuryl acrylate, glydidyl acrylate, hexylacrylate, methylmethacrylate, butyl methacrylate, isobutyl methacrylate, tert.-butyl methacrylate, isobornyl methacrylate, furfuryl methacrylate, glydidyl methacrylate; substituted or unsubstituted acrylamides, such as methacrylamide, dimethylacrylamide, di-isopropylacrylamide; acrylonitrile; vinylpyridines; vinyl ketones, such as vinylmethylketone; acrolein and acrolein derivates. Mixtures of these monomers can be used to prepare copolymers.

The process of the present invention can be carried out in a broad temperature range. Polymerization reactions can be conducted with Michael-type monomers in a range of −115° C. to 150° C. In most cases, the process of the present invention can be carried out at about room temperature, which is advantageous as no heating or cooling is necessary. Activity of the catalyst and initiator compound can be increased, by lowering the temperature to 0° C. or below and very favourable results can be obtained. High conversion rates are obtained between about 0° C. and room temperature, i.e. 25° C. Thus, although the process can be used in a broad temperature range, in a preferred embodiment, the process is carried out at a temperature between −10° C. and 40° C., preferably between 0 and 25° C. The optimum temperature for a specific process can be found in routine tests depending on the catalyst and initiator compound, monomer and solvent used.

In a preferred embodiment, the process of the present invention can be carried out under protection gas which can be selected from nitrogen, helium, argon, xenon and other protection gases known to the person skilled in the art.

The process of the invention allows high polymeric yields such as at least 80% conversion of the monomers, or even between 90 and 100% or about 100%.

The process of the present invention allows to also control polydispersity and to obtain polymers having a low to very low polydispersity index.

The process of the present invention usually is carried out in a fluid medium which can be the monomer or an organic solvent which dissolves the monomer, in a salt melt, or a gas. The term "organic solvent" as used in the present application refers to a compound that is liquid at room temperature and/or process temperature. Organic solvents that are suitable for the preparation of polymers from monomers as defined are known and those that are used in the prior art can be used for the process of the present invention, too. Usually aromatic or aliphatic hydrocarbons, heteroaromatic and heteroaliphatic compounds, as long as they are liquid at process temperature, or ionic solvents are suitable. Also salt melts as well as supercritical $CO_2$ can be used. Aromatic hydrocarbons that are very common in this field are preferred, such as toluene which is particularly useful.

An organic solvent in the process of the present invention can have different functions: it can be used as inert carrier that not necessarily dissolves both components; i.e. metal catalyst and monomer component, it can be used to dissolve the monomer; it can be used as heat dissipating agent. Furthermore, the polarity of the solvent can have an influence on the tacticity. Thus, in cases where tacticity is an issue the polarity of the solvent has to be considered and a suitable solvent has to be selected. Furthermore, in some embodiments the monomer can be the solvent for the metal compound and no additional solvent is necessary. The amount of solvent is that which is usually used. By increasing or decreasing the amount of solvent, the activity and the duration can be influenced as it is well-known to the skilled person.

The present invention is also concerned with the use of a metal compound of formula I as defined above and in the claims as catalyst and/or initiator for polymerization of a monomer component.

The present invention also relates to polymers which are obtainable by a catalyst and initiator and by the processes of the present invention. As already indicated, according to the present invention polymers can be obtained that are characterized by having a terminal functional group such as an olefinic end group, an aromatic group, a heteroaromatic group, an alkynyl group, a mercapto group, a furfuryl group etc., or a chemoactive or bioactive group, for example a nucleobase. The terminal functional group can be used, to crosslink polymer chains, to immobilise polymer chains etc.

Such a terminal group allows functionalization and chemical variation. Thus, the polymers can be functionalized in many different ways so that a versatile product is provided. The terminal group can be used for coupling other molecules like other polymers to form block copolymers.

Another example is the introduction of chemoactive groups that can be used for further reactions, such as alkynes and thiols for click reactions, thiols and alkenes for thiol-ene chemistry, or initiators capable of initiating a radical polymerization. Those functional groups can be easily introduced and increase versatility. Furthermore, reactions with transition metal catalysts allow copolymerisation with olefinically unsaturated monomers like ethene or propene. Another option is the introduction of bioactive groups; for example introducing thiocholesterin or cholesterin and folic acid derivatives can increase membrane permeation or compatibility of the polymers.

The present invention allows to obtain a mutliplicity of polymers with valuable properties. One example is a polymer or copolymer of one or more of Michael monomers selected from the group consisting of vinylphosphonate, in particular diethylvinylphosphonate, or diisopropylvinylphosphonate; vinylsulfonate, substituted or unsubstituted acrylate and methacrylate, such as methyl acrylate, butyl acrylate, isobutyl acrylate, tert.-butyl acrylate, isobornyl acrylate, furfuryl acrylate, glydidyl acrylate; butyl methacrylate, isobutyl methacrylate, tert.-butyl methacrylate, isobornyl methacrylate, furfuryl methacrylate, glydidyl methacrylate substituted or unsubstituted acrylamide, such as methacrylamide, dimethylacrylamide, acrylonitrile, vinylpyridine, vinyl ketone, acrolein or an acrolein derivate, or mixtures thereof.

Furthermore, the system of the present invention allows to polymerize tactic polymers by selecting a catalyst that favours tacticity. "Tactic polymers" refers to polymers that have an increased syndio- or isotaciticity compared to an average syndio- or isotacticity of the polymer. Therefore, another subject of the present invention is a process for preparing a polymer having increased syndio- or isotacticity comprising contacting a a metal compound as sole catalyst and initiator, optionally dissolved in an organic solvent, with a monomer component, wherein the metal compound is $MR^1R^2R^3$ wherein M is aluminum, gallium or indium, each of $R^1$, $R^2$, and $R^3$, is independently CI, F, I, Br or linear, branched or cyclic alkyl, heterocycloalkyi, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, nitro, nitroso, hydroxy, or carboxyl, wherein each alkyl, alkenyl, alkynyl, or alkoxy independently has up to 12 carbon atoms, wherein each aryl or heteroaryl independently has 5 to 14 ring atoms, wherein any hetero group has at least one hetero atom selected from O, S or N, wherein each alkyl, alkenyl, alkynyl or alkoxy, heterocycloalkyi, heterocycloalkenyl, heterocycloalkynyl, aryl, heteroaryl, aryloxy group can be substituted by 1 up to the highest possible number of halogen atoms; and wherein either all three groups $R^1$, $R^2$, and $R^3$ are different or $R^1$ and $R^2$ are the same and $R^3$ is different and is a bulky group; or wherein two of $R^1$, $R^2$, and $R^3$ together with Al form a substituted or unsubstituted cyclic group comprising 2 to 5 carbon atoms or 2 to 4 carbon atoms and 1 to 3 hetero atoms selected from O, S or N; wherein the monomer component comprises at least one Michael-type monomer and/or at least one heterocyclic monomer selected from the group consisting of a substituted or unsubstituted lactone having up to 9 ring atoms, a substituted or unsubstituted lactam having up to 9 ring atoms, or a substituted or unsubstituted 1,4-dioxan-2, 4-dione, or a mixture thereof; and/or a combination of $CO_2$ and at least one comonomer selected from the group of substituted or unsubstituted oxirane with 3 or 4 ring atoms, substituted or unsubstituted aziridine or azetidine.

Polymers having increased syndio- or isotacticity are particularly valuable. For example can tacticity enhance biodegradability of polymers like lactide/glykolide polymers, butyrolactone derived polymers etc.

A metal compound can for example carry one transferable group, one sterically encumbered group, like tert-butyl or heteroaryl, and one small group like methyl or ethyl.

It has been found that by using an asymmetric metal compound of formula I as defined above it is possible to prepare polymers having increased syndio- or isotacticity. Without being bound by theory it is assumed that a polymer with enhanced tactic content is produced if the applied catalyst is substituted by ligands with different sterical encumberance. As soon as the initiating step takes place one of the catalyst ligands is transferred to the coordinating monomer. If the remaining catalyst ligands are of different sterical encumberance, the growing polymer chain will be directed to the less demanding ligand. Therefore, a preferred arrangement of growing polymer chain catalyst ligands and new monomer will take place. This preferred arrangement will result in the formation of a tactically enriched polymer.

The system and the process of the present invention offer another very valuable option, i.e. to introduce functional groups by adapting the ligands of the metal compound. In one embodiment of the present invention this versatility of the catalyst is used to provide polymers with luminescent groups or with groups that can be induced to become luminescent. There is a high academic and economic interest in photoluminescent polymers, as they can be applied in various fields from analytics to biomedical applications. For example photoluminescent poly(lactone)s can be used in the cancer research as tumor markers (Jian Yang et al. "Development of Intrinsically Photoluminescent and Photostable Polylactones". Advanced Materials, 2014, 26, 4491-449). Usually, in order to enable photoluminescent properties, molecules with a huge conjugated π-System have to be chemically attached to the polymer chain end through post polymerization modifications such as thiol-ene click reactions or via the use of photoluminescent radical initiators. Both methods are complex to perform and are partly extremely cost intensive and time consuming. A further method to modify polymeric material in order to gain photoluminescent properties is the dotation of the polymeric samples with rare earth elements such as Europium (Bermudez et al. "Highly Photostable Luminescent Poly(ε-caprolactone)siloxane Biohybrids Doped with Europium Complexes". Chemistry of Materials, 2007, 19 (16), 3892-3901).

Surprisingly it was found that by use of the catalysts of the present invention, it is possible to synthesize polymers of the monomer components as defined in the claims without relying on complex syntheses or cost intensive processes. When using a catalyst of the present invention, a heterocyclic monomer as described coordinates to the metal center of the described catalyst. The polymerization is initiated by the transfer of one of the catalyst ligands as exemplified in Scheme 3. After a predetermined time, the reaction can be stopped by quenching and a polymer can be precipitated. Without being bound by theory it is assumed that in dependence of the structure of the transferred group a tautomerization can occur which results in a conjugated π-System as exemplified in Scheme 3. This allows to tailor the wavelength of the emitted light by changing the catalyst ligand to be transferred.

Scheme 3

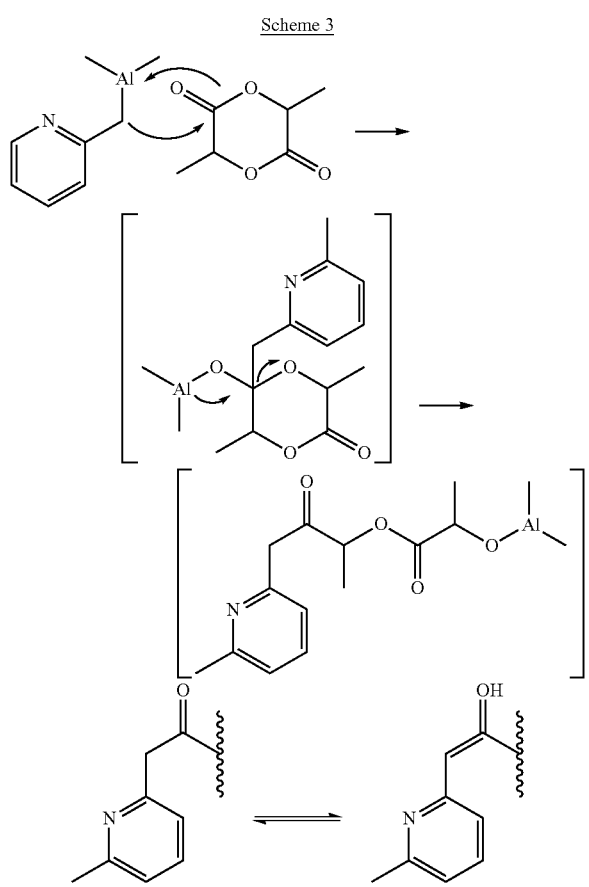

The process for preparing luminescent polymers corresponds to the processes as defined above. It was found that just by using a specific type of catalyst and initator compound components having luminescence can be obtained. The process can be carried out with the same parameters as the process defined above. Preferably, heterocyclic monomers as defined above or a combination of carbondioxide with oxirane, aziridine, and/or azetidine are used as monomer component. Color of the luminescent polymer can range over the whole visible spectra. The color can for example be red, blue, green, yellow, orange, or violet.

A further aspect of the present invention are the luminescent components obtainable by the above described process. The polymers obtained are biocompatible and the luminescent properties, e.g. fluorescence, color, can be controlled by choosing catalyst and monomers as described above.

Without being bound by theory, it is assumed that the luminescence of the components results from the terminal group, i.e. the electrophilicly substituted heterocycle which is the initiator for the polymerization reaction.

The color can be adjusted for any polymer by choosing metal ligand, monomer and electrophilic substitution. The desired luminescence color can be easily calculated by the absorption increments of respective substituents according to the Woodward-Fieser-rules which are known to the person skilled in the art. The polymer attached to the luminescent end group is not critical for the color of the polymer.

With the catalytic active compounds and processes of the present invention polymers with many favourable properties can be obtained. These polymers can be used in many different fields, such as, photocatalytic reduction, optical fiber waveguides, pH-sensing, temperature sensing, molecular-recognition processes with photonic (fluorescence) signals, phase transfer catalysis, photoluminescent magnetic sensor (via complexation of magnetic metals), photoluminescence quenching assays, as for example developed for the analysis of proteins, among others.

EXAMPLES

Figure 2:
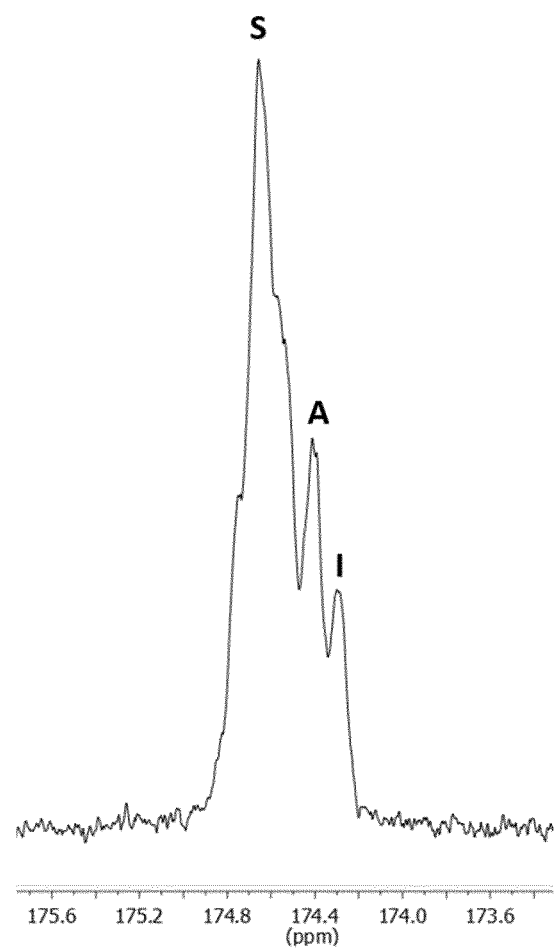
FIG. 2 shows a $^{13}$C-NMR (125 MHz) spectrum of the polymer sample produced in example 4 in CDCl$_3$ at 20° C., wherein S indicates signals corresponding to the syndiotactic content, A signals corresponding to the atactic content and I signals corresponding to the isotatic content of the polymer.
Figure 3:
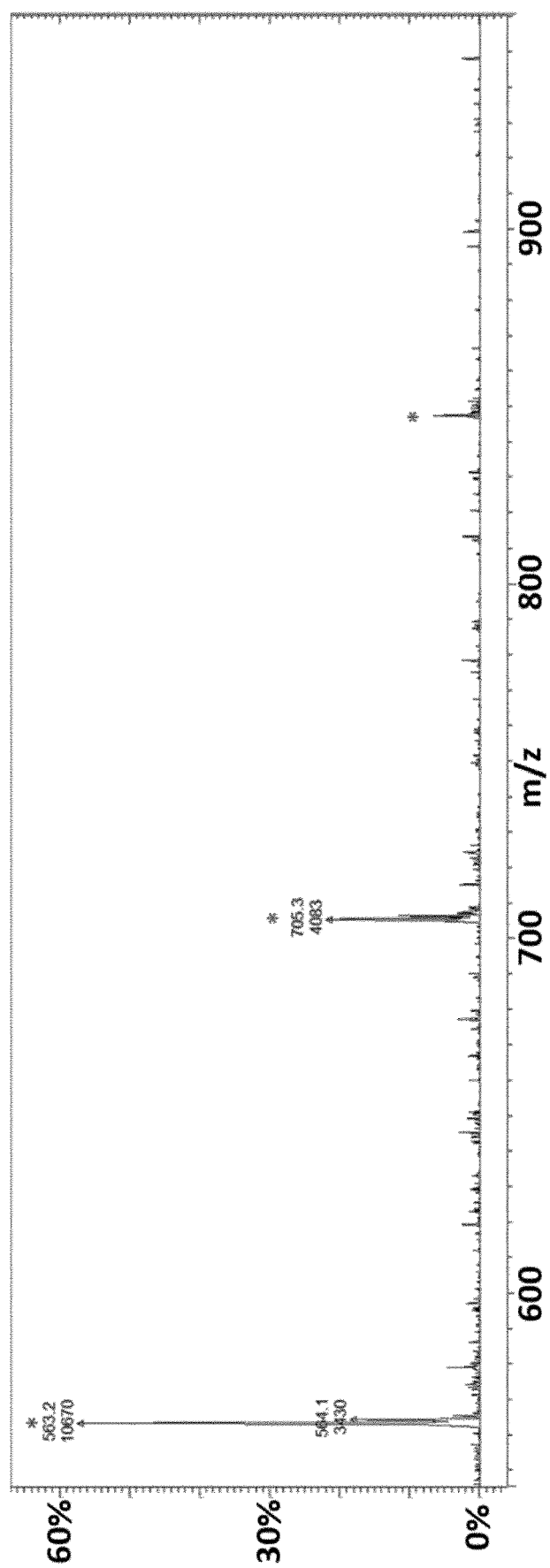
FIG. 3 shows an ESI MS spectrum of tBuMA oligomers produced with [Al(nOct)$_3$]. One major series of peaks is evident: m/z=n×M$_{Mon}$+113+M$_H$ (red); M$_{Mon}$=142, end groups: M$_{nOct}$=113.
Figure 4:
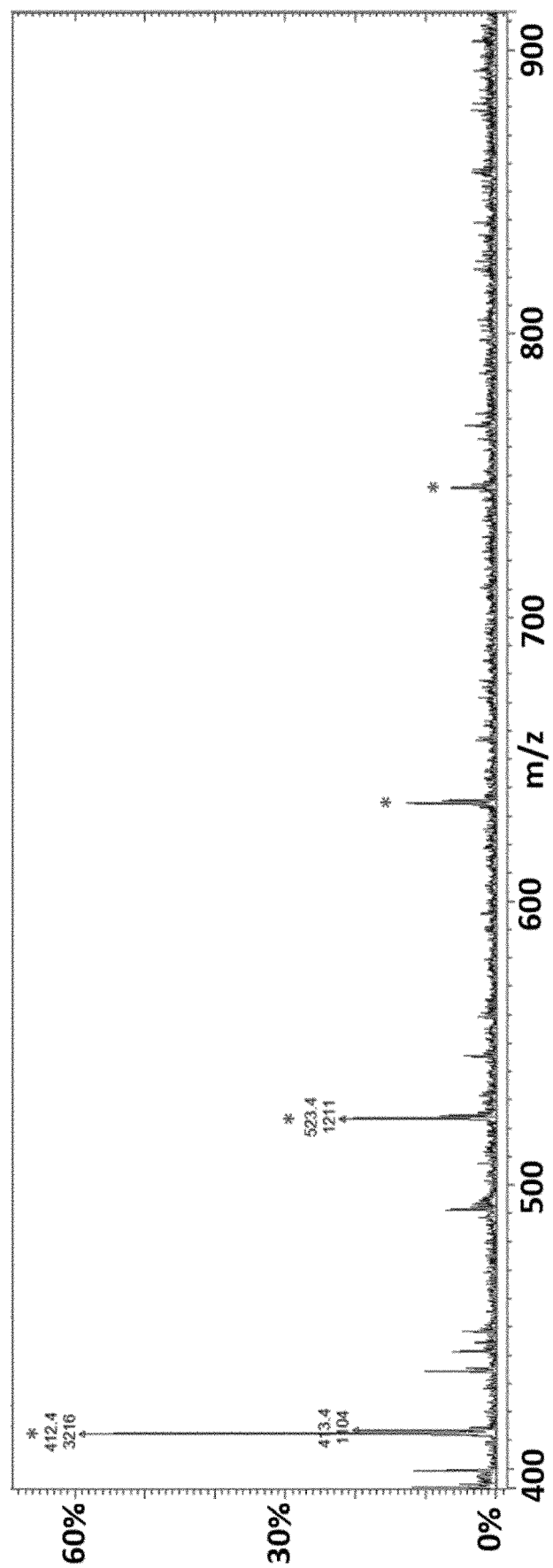
FIG. 4 shows an ESI MS spectrum of IPox oligomers produced with [Al(C$_6$H$_5$)$_3$]. One major series of peaks is evident: m/z=n×M$_{Mon}$+77+M$_H$ (red); M$_{Mon}$=111, end groups: M$_{C6H5}$=77.
Figure 5:
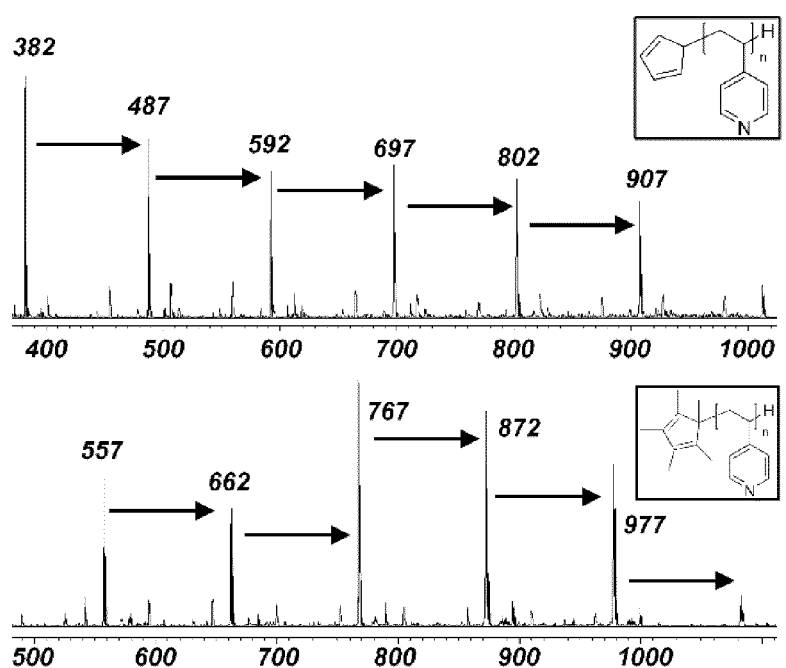
FIG. 5 shows an ESI MS spectrum of IPox oligomers produced with [Al(CH$_3$)$_2$Cp] and [Al(CH$_3$)$_2$Cp*], respectively. One major series of peaks is evident: m/z=n×M$_{Mon}$+66+M$_H$(red); M$_{Mon}$=136.

In the examples polymers were prepared and were tested using gel permeation chromatography (GPC) for detection. GPC was made using a WTC Dawn Heleos II MALS detector. GPC was carried out on a Varian LC-920 system with two PL polar gel columns and N,N-dimethyl formamide (0.025 M LiBr) (polyacrylonitrile) or tetrahydrofurane/water (0.025 M tetrabutylammoniumbromide) (vinylphosphonates and vinylpyridines)) or tetrahydrofurane (acrylates or methacrylates) were used as liquid medium. The retention times were recorded via a MALLS detector and via an integrated RI detector (356-LC). The GPC spectrum is shown in FIG. 2.

The NMR spectra were recorded with an AV III 500C of Bruker and were evaluated with Top Spin 3 software.

In the following examples specific embodiments of the present invention are shown without thereby limiting the scope of the invention.

Monomers like acrylonitrile, methacrylates, and 2-isopropenyl-2-oxazoline were polymerized using an metal compound of formula I adapted in acidity. The conditions and results are shown in Tables 4 and 5. The method is described in detail below.

Example 1

Polyacrylonitrile was synthesized using 3 different aluminum compounds as catalyst and initiator in the polymerization reaction. Different ratios of monomer/catalyst were used. For each run the catalyst was added to 7.0 ml N,N-dimethylformamide as solvent. The reaction temperature was 40° C. The results are shown in Table 4.

TABLE 4

Selected results of the polymerization of acrylonitrile with different catalysts at 0° C.

| Run | Lewis acid | t [s] | Mon./L.A. | Mn[a] | Mw[a] | D | Y [%] | TOF [h$^{-1}$] |
|---|---|---|---|---|---|---|---|---|
| 1 | Al(C$_6$F$_5$)$_3$ | 5 | 4000 | 105 | 168 | 1.59 | 4 | 115,000 |
| 2 | Al(C$_6$F$_5$)$_3$ | 15 | 4000 | 30139 | 228 | 1.64 | 10 | 103,000 |
| 3 | Al(C$_6$F$_5$)$_3$ | 30 | 4000 | n.d. | 692 | n.d. | 23 | 110,000 |
| 4 | Al(C$_6$F$_5$)$_3$ | 150 | 8000 | n.d. | 1600 | n.d. | 46 | 88,000 |

TABLE 4-continued

Selected results of the polymerization of acrylonitrile
with different catalysts at 0° C.

| Run | Lewis acid | t [s] | Mon./LA. | $M_n^{(a)}$ | $M_w^{(a)}$ | D | Y [%] | TOF [$h^{-1}$] |
|---|---|---|---|---|---|---|---|---|
| 5 | Al($C_6F_5$)$_3$ | 30 | 1000 | n.d. | 350 | n.d. | 74 | 89,000 |
| 6 | Al(Ph)$_3$ | 600 | 2000 | — | — | — | — | — |
| 7 | B($C_6F_5$)$_3$ | 600 | 2000 | — | — | — | — | — |

[a]determined by GPC

As can be seen acrylonitrile was polymerized very efficient with Al(C6F5)3 as acrylonitrile is an electron-deficient monomer and Al(C6F5)3 is a highly active catalyst, i.e. a strong Lewis acid. When a less strong Lewis acid was used, (Al(Ph3)3, no polymerisation took place. A boron compound that is known as catalyst was also tested and did not yield a polymer.

Example 2 (for Comparison)

Acrylonitrile was used as monomer with AlCl$_3$ as catalyst as known in the prior art. The reaction was performed in oven-dried glass reactor, AlCl$_3$ (302 µL, 12.5 mmol/L suspension in toluene) was added and cooled to 0° C. Acrylonitrile (500 µL, 3.77 mmol, 400 mg, 2,000 equivalents) and thereafter tricyclohexylphosphine (PEt$_3$) (151 µL, 25.0 mmol/L solution in toluene, 1 equivalents) were added and the mixture was stirred for 15 min at 0° C. The reaction was stopped by adding a mixture of DMF-MeOH—HCl (100:10:1). A sample was taken and an $^1$H-NMR was recorded. The reaction yielded no polymer, although a Lewis base was added for activation.

Example 3

Polymerisation experiments were carried out with different monomers and catalysts. The reaction time was 60 min. The catalyst was added to toluene as solvent, the total solvent volume was 2 mL. For experiment 11 pentane was used as solvent. The molecular mass was determined by GPC-MALS or dual angle laser light scattering in H$_2$O/THF (9 g/L tetrabutylammonium bromide) or THF at 40° C., reported in 10$^3$ g/mol, The yield was measured gravimetrically and by $^1$H NMR spectroscopy, rr [%] was determined by $^{13}$C NMR spectroscopy, 21. For experiment 14 ACF induces a cationic ring opening polymerization. The results are summarized in Table 5.

As can be seen from the results in Table 5, polymerization occurs only when catalyst and monomer match.

In experiment 8 a monomer of group B is reacted with a strong Lewis acid and no reaction is seen. In experiments 12 and 13 a too weak catalyst is used and no polymerization occurs. When using in experiments 9-11 a suitable Lewis acid the polymerization runs very well. The same effect is shown in experiments 14, with no polymerization with a strong catalyst versus experiments 15-18 with good results. These results confirm that by selecting a suitable metal compound difficult monomers can be polymerized that could not be polymerized by GTP until now.

TABLE 5

Selected results of the polymerization of Methacrylates
and Oxazolines with Al(III)-based catalysts in toluene.

| Exp. | Mon | LA | Mon./LA | T [° C.] | $M_n$[b] | Đ | Y [%][c] | rr [%][d] |
|---|---|---|---|---|---|---|---|---|
| 8 | tBuMA | Al($C_6F_5$)$_3$ | 100 | 60 | — | — | — | — |
| 9 | tBuMA | Al(nOct)$_3$ | 100 | 60 | 155 | 1.33 | 100 | 62 |
| 10 | tBuMA | Al(nOct)$_3$ | 100 | rt | 175 | 1.19 | 42 | 66 |
| 11 | tBuMA | Al(nOct)$_3$ | 100 | rt | 395 | 1.25 | 83 | 70 |
| 12 | tBuMA | Al(iBu)$_3$ | 100 | rt | — | — | — | — |
| 13 | tBuMA | Al(Me)$_3$ | 100 | rt | — | — | traces | — |
| 14 | IPox | Al($C_6F_5$)$_3$ | 100 | rt | — | — | 0[e] | — |
| 15 | IPox | Al(Ph)$_3$ | 150 | 60 | 18 | 1.29 | 59 | 46 |
| 16 | IPox | Al(Ph)$_3$ | 100 | rt | 12 | 1.19 | 34 | 63 |
| 17 | IPox | Al(Ph)$_3$ | 100 | rt | 63 | 1.05 | 55 | 72 |
| 18 | IPox | Al(Ph)$_3$ | 100 | 0 | 15 | 1.02 | 17 | 77 |

[a] Reaction time 60 min., total solvent volume 2 mL (solvent toluene, except exp. 11 pentane)

[b]determined by GPC-MALS or dual angle laser light scattering in H$_2$O/THF (9 g/L tetrabutylammonium bromide) or THF at 40° C., reported in 10$^3$ g/mol.

[c]yield measured gravimetrically and by $^1$H NMR spectroscopy,

[d]determined by $^{13}$C NMR,[21]

[e]ACF induces a cationic ring opening polymerization[22]

Example 4

A polymer with enriched tacticity was synthesized using a catalyst of formula I, wherein $R^1$, $R^2 \neq R^3$.

N,N-dimethylacrylamide was polymerized in a total solvent volume of 2 mL tetrahydrofuran with a ratio of 100:1 of monomer to catalyst at room temperature. The applied catalyst was bis((furan-2-ylmethyl)thio)(methyl)aluminum:

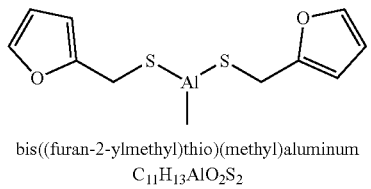

bis((furan-2-ylmethyl)thio)(methyl)aluminum
$C_{11}H_{13}AlO_2S_2$

After 2 minutes the reaction was quenched with methanol and the reaction solution was precipitated in pentane. The tacticity of the obtained polymer was quantified by $^{13}$C-NMR-Spectroscopy. The resulting spectrum is depicted in FIG. 2. By performing a peak deconvolution the syndiotactic (rr) content of the polymer was determined to be 78%.

Example 5

A polylactone was synthesized using a catalyst of formula I, wherein $R^1$, $R^2 \neq R^3$. ε-Caprolactone was polymerized in a total solvent volume of 2.5 mL toluene with a ratio of 100:1 monomer to catalyst at 50° C. The applied catalyst was dimethyl((6-methylpyridin-2-yl)methyl)aluminum:

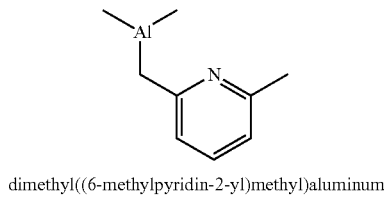

dimethyl((6-methylpyridin-2-yl)methyl)aluminum

Figure 6:
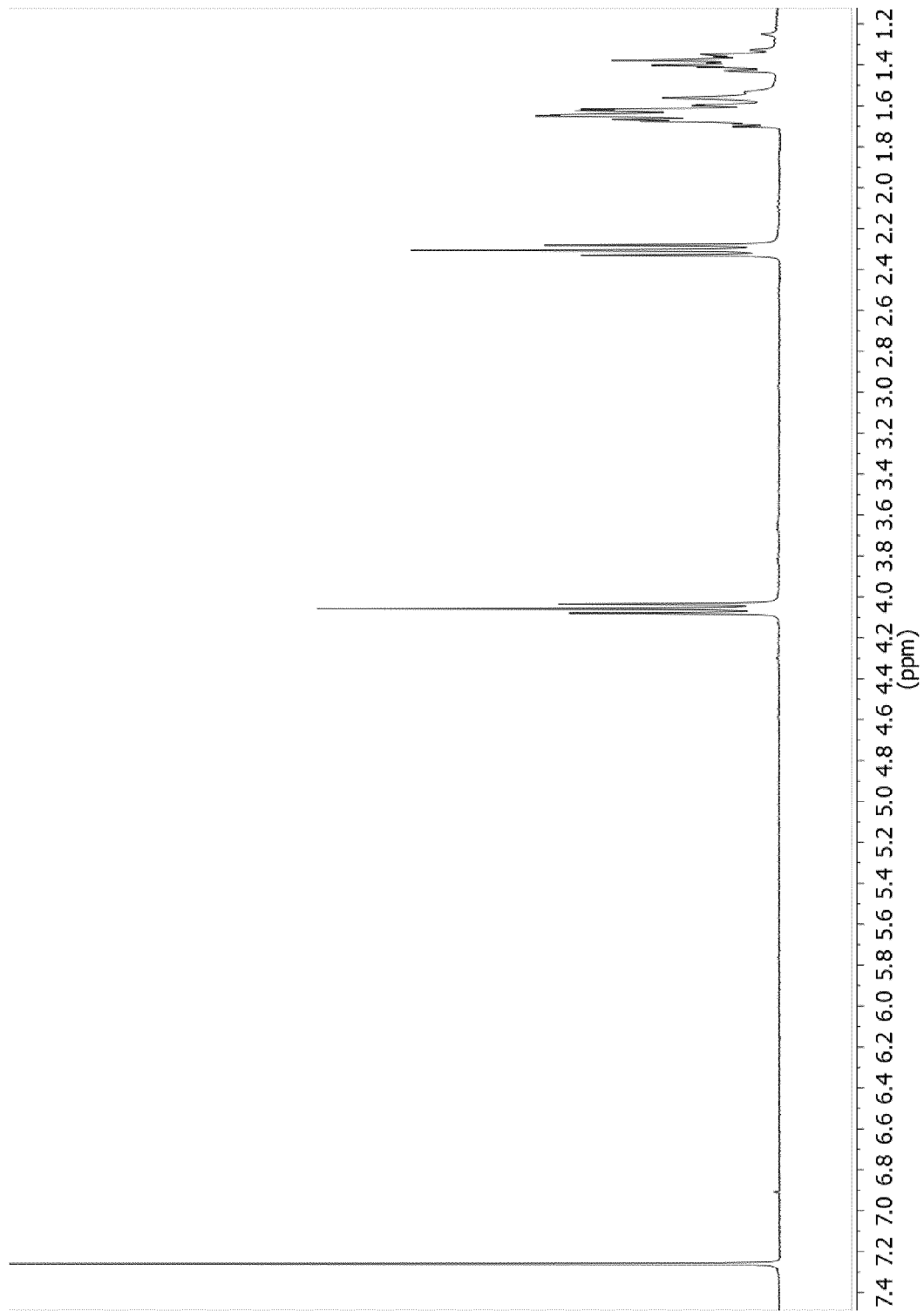
FIG. 6 shows a $^1$H-NMR spectrum of poly(ε-caprolactone) produced with dimethyl-((6-methylpyridin-2-yl)methyl)aluminum as catalyst.

After 10 minutes the reaction was quenched with methanol and the reaction solution was precipitated in pentane. Yields where determined via $^1$H-NMR and gravimetric methods to be 100%. The $^1$H-NMR spectrum of the precipitated polymer is depicted in FIG. 6. Molecular mass and dispersity of the resulting polymer were determined to be 20,000 g mol$^{-1}$ and PDI=1.15.

Example 6

A polylactide was synthesized using a catalyst of formula I, wherein $R^1$, $R^2 \neq R^3$. Rac-lactide was polymerized in a total solvent volume of 2.5 mL mesitylene with a ratio of 100:1 monomer to catalyst at 110° C. The applied catalyst was dimethyl((6-methylpyridin-2-yl)methyl)aluminum:

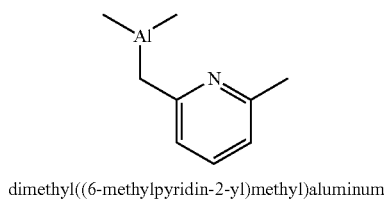

dimethyl((6-methylpyridin-2-yl)methyl)aluminum

Figure 7:
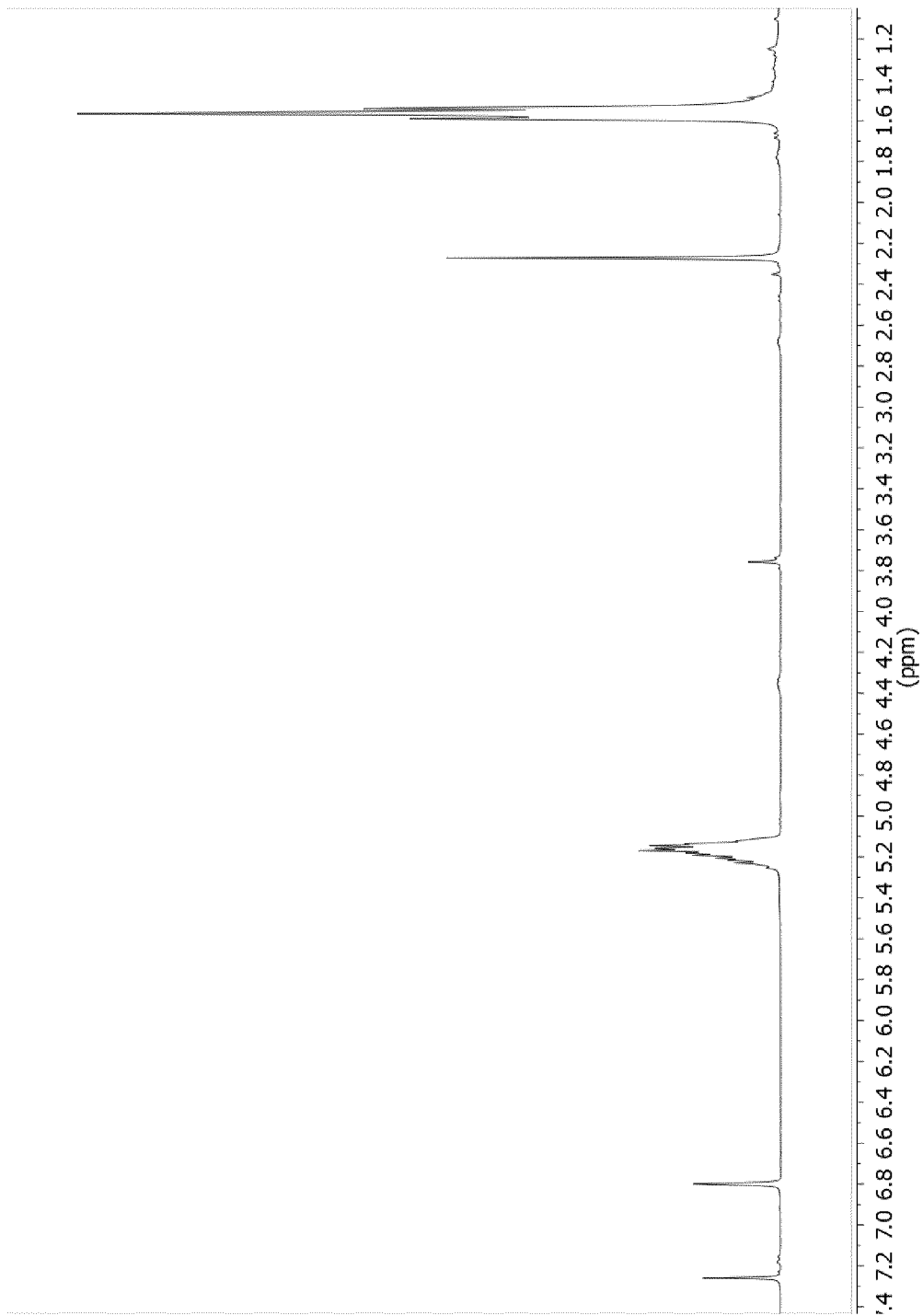
FIG. 7 shows a $^1$H-NMR spectrum of polylactide produced with dimethyl-(2-pyridinylmethyl)aluminum as catalyst.

After 30 minutes the reaction was quenched with methanol and the reaction solution was precipitated in pentane/EtOH=1:1. Yields where determined via $^1$H-NMR and gravimetric methods to be 80%. The $^1$H-NMR spectrum of the precipitated polymer is depicted in FIG. 7. Molecular mass and dispersity of the resulting polymer were determined to be 22,000 g mol$^{-1}$ and PDI=1.19.

Example 7

Figure 8:
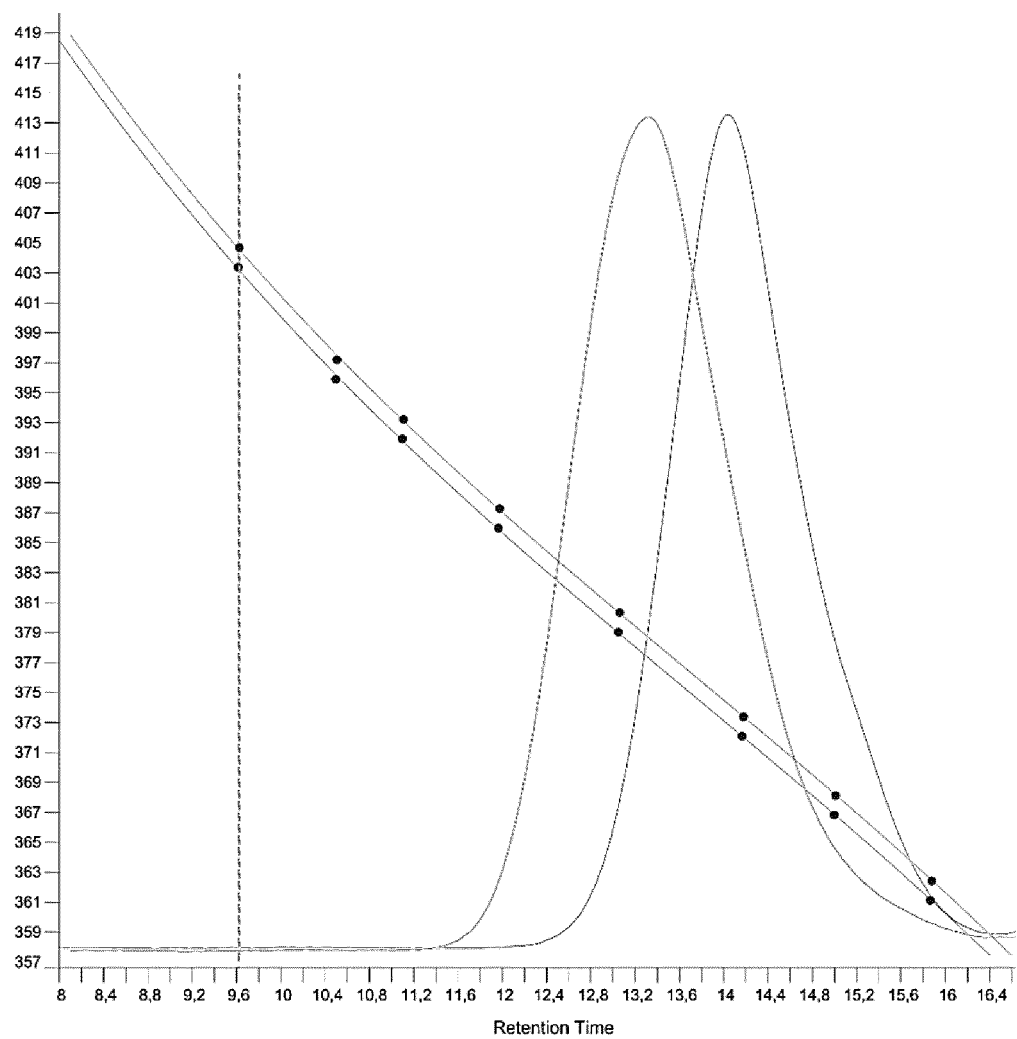
FIG. 8 shows a GPC chromatogram with a trace of polylactide (right peak) and poly(lactide co ε-Caprolactone) left side.

A poly(lactide co ε-Caprolactone) was synthesized using a catalyst of formula I, wherein $R^1$, $R^2 \neq R^3$. Rac-lactide was polymerized in a total solvent volume of 2.5 mL mesitylene with a ratio of 100:1 monomer to catalyst at 110° C. After full conversion, 100 equivalents of the second monomer componend ε-Caprolactone were added. The applied catalyst was dimethyl((6-methylpyridin-2-yl)methyl)aluminum:

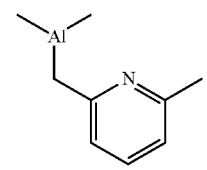

dimethyl((6-methylpyridin-2-yl)methyl)aluminum 10 minutes after the addition of a second monomer component the reaction was quenched with methanol and the reaction solution was precipitated in pentane/EtOH 1:1. Yields where determined via $^1$H-NMR and gravimetric methods to be 82%. The GPC traced of the monomer (right peak) and the corresponding copolymer (left peak) are depicted in FIG. 8. Molecular mass and dispersity of the first block (polylactide) were determined to be 22,400 g mol$^{-1}$, PDI=1.2. Molecular mass and PDI of the copolymer (poly (lactide co ε-Caprolactone) were determined to be 27,000 g mol$^{-1}$ PDI=1.35. It is also clearly visible that the retention time of the copolymer is higher than the retention time of the corresponding lactide-homopolymer.

Example 8

A Poly(cyclohexenecarbonate) was synthesized using a catalyst of formula I, wherein $R^1$, $R^2 \neq R^3$. The catalyst was dissolved in 5 mL toluene and 1.5 mL cyclohexeneoxide were added at 80° C. to the reaction solution. The reactor was than pressurized with 30 bar $CO_2$. The applied catalyst was dimethyl((6-methylpyridin-2-yl)methyl)aluminum:

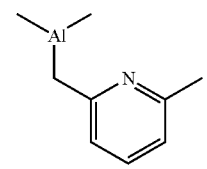

dimethyl((6-methylpyridin-2-yl)methyl)aluminum

Figure 9:
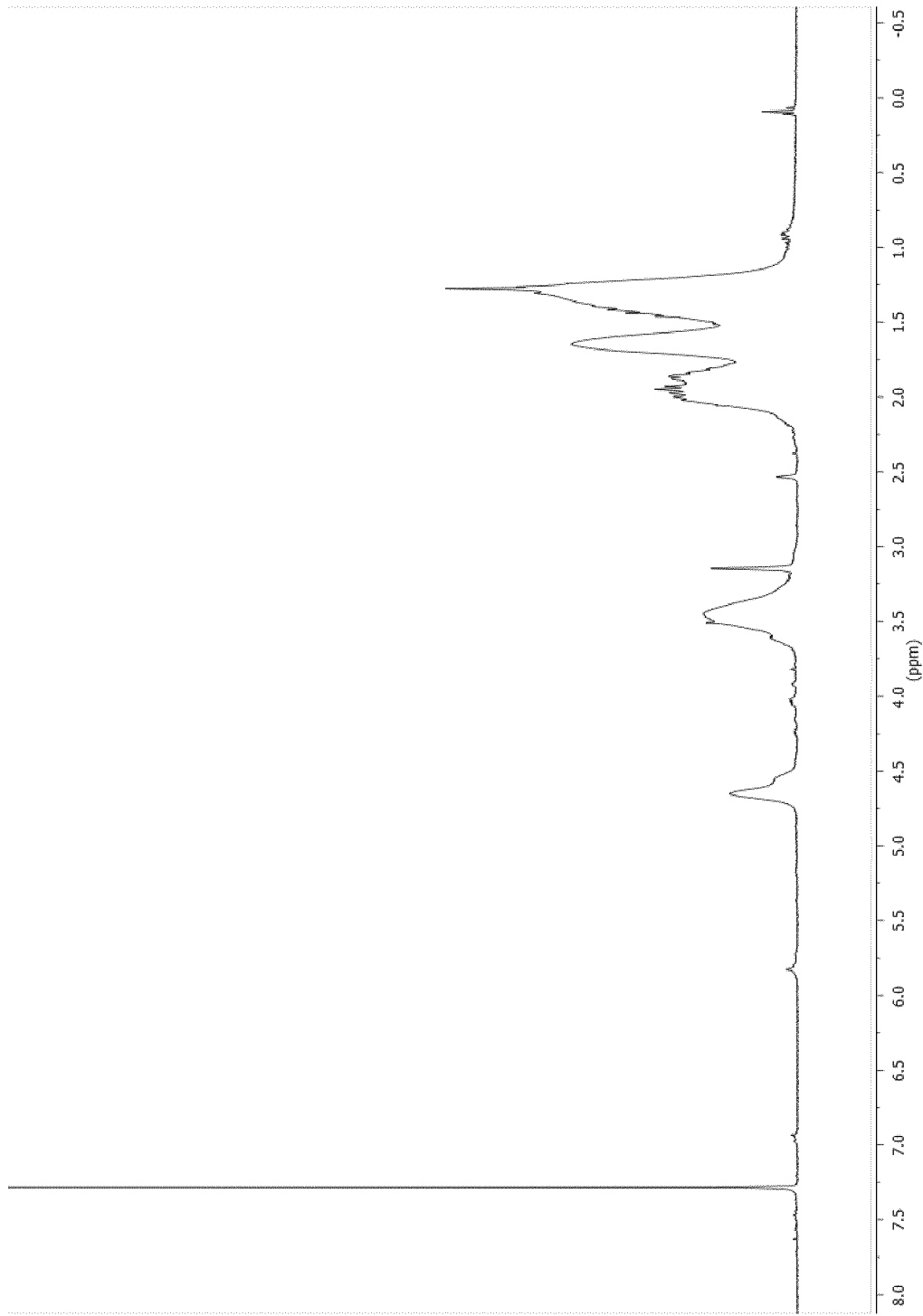
FIG. 9 shows a $^1$H-NMR spectrum of a poly(cyclohexenecarbonate) produced with dimethyl-(2-pyridinylmethyl) aluminum as catalyst and with a combination of cyclohexeneoxide and CO$_2$ as comonomers.

After 180 minutes the reaction was quenched by releasing the pressure and addition of methanol. The reaction solution was than precipitated in Methanol. Yields where determined via $^1$H-NMR and gravimetric methods to be 76%. The $^1$H-NMR spectrum of the precipitated copolymer is depicted in FIG. 9. Signals corresponding to polycarbonate linkages ($\delta$=4.65 ppm) are clearly visible. Molecular mass and dispersity of the resulting copolymer were determined to be 10,000 g mol$^{-1}$ and PDI=1.37. The amount of incorporated $CO_2$ was determined via $^1$H-NMR to be 40%.

Example 9

A copolymer of diethylvinylphosphonate and lactide was synthesized using a catalyst of formula I, wherein $R^1$, $R^2 \neq R^3$. diethylvinylphosphonate was polymerized in a total solvent volume of 2.5 mL toluene with a ratio of 200:1 monomer to catalyst at 50° C. After full conversion the reaction temperature was raised to 120° C. and 50 equivalents of the second monomer component rac-lactide were added. The applied catalyst was dimethyl((6-methylpyridin-2-yl)methyl)aluminum:

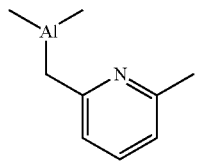

dimethyl((6-methylpyridin-2-yl)methyl)aluminum

Figure 10:
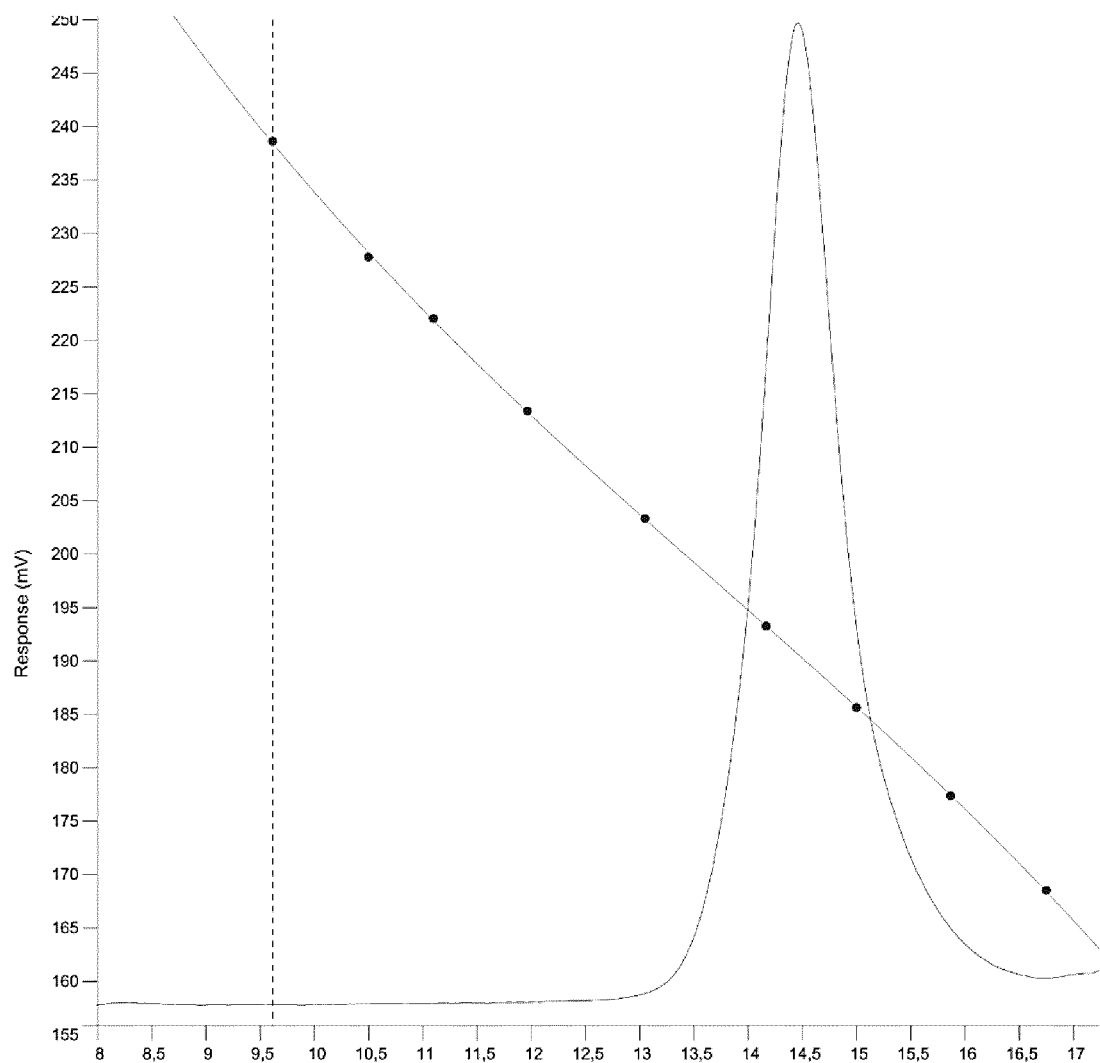
FIG. 10 shows a GPC chromatogram with a trace of a copolymer of diethylvinylphosphonate and rac-lactide.

After 60 minutes the reaction was quenched by the addition of methanol. The reaction solution was then precipitated in pentane/EtOH=1:1. Yields where determined via $^1$H-NMR and gravimetric methods to be 80%. The monomodal GPC trace of the copolymer is depicted in FIG. 10. Molecular mass and dispersity were determined to be 12,400 g mol$^{-1}$, PDI=1.22.

Example 11

A polylactide was synthesized using a catalyst of formula I, wherein $R^1$, $R^2 \neq R^3$. Rac-lactide was polymerized in a total solvent volume of 2.5 mL mesitylene with a ratio of 100:1 monomer to catalyst at 110° C. The applied catalyst was dimethyl((6-methylpyridin-2-yl)methyl)aluminum:

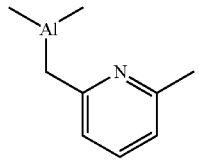

dimethyl((6-methylpyridin-2-yl)methyl)aluminum

Figure 11:
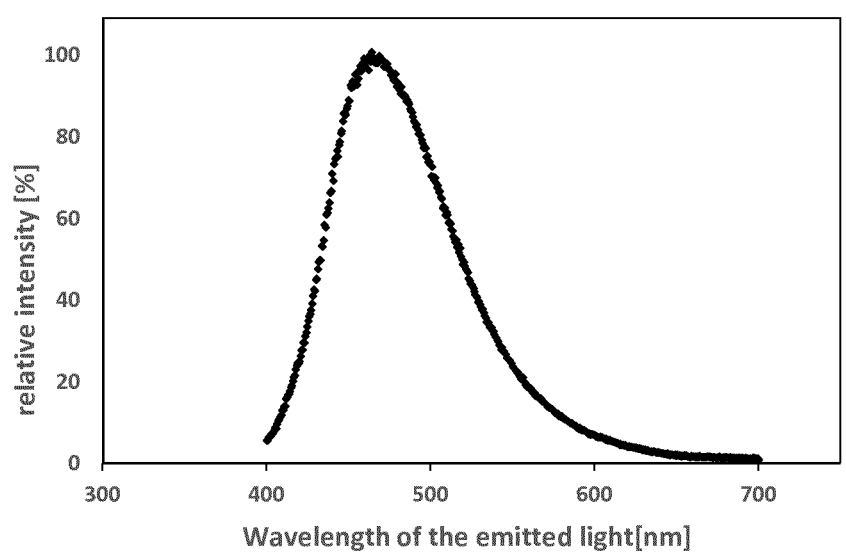
FIG. 11 shows an emission-spectrum of a poly(lactide) sample synthesized with dimethyl((6-methylpyridin-2-yl)methyl)aluminum as catalyst (left side). Emission maximum at 463 nm

After 30 minutes the reaction was quenched with methanol and the reaction solution was precipitated in pentane/EtOH=1:1. Yields where determined via $^1$H-NMR and gravimetric methods to be 80%. Molecular mass and dispersity of the resulting polymer were determined to be 22,000 g mol$^{-1}$ and PDI=1.19. Photoluminescence spectra were taken with an AVA-Spec 2048 from Avantes using a Prizmatix (LED Current controller) as light source. Samples were excited with a 365 nm source. The resulting spectrum and the polymer solution are depicted in FIG. 11. At an excitation wavelength of 365 nm the polymer emits light with a wavelength of 463 nm.

The invention claimed is:

1. A system for polymerization comprising a monomer component, and a metal compound as sole initiator, wherein the monomer component comprises at least one Michael-type monomer, and wherein the metal compound is $MR^1R^2R^3$, wherein M is aluminum, gallium, or indium, each of $R^1$, $R^2$, and $R^3$ independently is F, I, Br, linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, hydroxy, or carboxyl, wherein each alkyl, alkenyl, alkynyl or alkoxy group independently has up to 12 carbon atoms, wherein each aryl or heteroaryl independently has 5 to 14 ring atoms, wherein any hetero group has at least one hetero atom selected from the group consisting of O, S, and N, wherein each alkyl, alkenyl, alkynyl or alkoxy, heterocycloalkyl, heterocycloalkenyl, heterocycloalkynyl, aryl, heteroaryl, aryloxy group is optionally substituted by 1 up to the highest possible number of halogen atoms, or by at least one electron-donating or electron-withdrawing group; with the proviso that not all three groups $R^1$, $R^2$, and $R^3$ are halogen, hydroxy, or alkoxy; or wherein two of $R^1$, $R^2$, and $R^3$ together with M form a substituted or unsubstituted cyclic group comprising 2 to 5 carbon atoms or 2 to 4 carbon atoms and 1 to 3 hetero atoms selected from the group consisting of O, S, and N.

2. The system for polymerization according to claim 1, comprising a) at least one Michael-type monomer,
b) a compound $MR^1R^2R^3$, wherein M, $R^1$, $R^2$, and $R^3$ are as defined in claim 1, as sole initiator;
c) optionally an organic solvent,
wherein the initiator is adapted to the monomer such that for an electron deficient monomer the initiator is $MR^1R^2R^3$ with a FIA of about 530 or less; for a monomer having medium electrophilicity the initiator is $MR^1R^2R^3$ with a medium FIA of less than 530 and more than 393; and for an electron donating or electron-rich monomer the initiator is $MR^1R^2R^3$ with a low FIA of 393 or more.

3. The system for polymerization according to claim 1 wherein the Michael-type monomer is a vinylphosphonate or mono- or dialkyllvinylphosphonate; a vinylsulfonate or mono- or dialkylsulfonate, a substituted or unsubstituted acrylate or methacrylate, a substituted or unsubstituted acrylamide or methacrylamide, acrylonitrile, a substituted or unsubstituted heteroaromatic vinyl compound, a substituted or unsubstituted vinyl ketone, acrolein, or an acrolein derivate, or a mixture of two or more thereof; or wherein the Michael-type monomer is butyl acrylate, isobutyl acrylate, tert.-butyl acrylate, isobornyl acrylate, furfuryl acrylate, glydidyl acrylate, butyl methacrylate, isobutyl methacrylate, tert.-butyl methacrylate, isobornyl methacrylate, furfuryl methacrylate, or glycidyl methacrylate, or a mixture thereof.

4. A system for polymerization comprising a monomer component and a metal compound as sole initiator, wherein the monomer component comprises at least one heterocyclic monomer selected from the group consisting of a substituted or unsubstituted lactone having up to 9 ring atoms, a substituted or unsubstituted lactam having up to 9 ring atoms, and a substituted or unsubstituted 1,4-dioxan-2,4-dione, or a mixture thereof, wherein each substituent independently is selected from linear, branched, or cyclic alkyl, alkenyl, alkynyl groups having up to 6 carbon atoms, linear, branched, or cyclic alkoxy groups having up to 6 carbon atoms, halogen, metallocenyl, hydroxy, carboxyl, aryl, or heteroaryl; and wherein the metal compound is $MR^1R^2R^3$, wherein M is aluminum, gallium, or indium; each of $R^1$, $R^2$, and $R^3$ independently is Cl, F, I, Br, linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, hydroxy, or carboxyl, wherein each alkyl, alkenyl, alkynyl or alkoxy group independently has up to 12 carbon atoms, wherein each aryl or heteroaryl independently has 5 to 14 ring atoms, wherein any hetero group has at least one hetero atom selected from the group consisting of O, S, and N, wherein each alkyl, alkenyl, alkynyl or alkoxy, heterocycloalkyl, heterocycloalkenyl, heterocycloalkynyl, aryl, heteroaryl, aryloxy group is optionally substituted by 1 up to the highest possible number of halogen atoms, or by at least one electron-donating or electron-withdrawing group; or wherein two of $R^1$, $R^2$, and $R^3$ together with M form a substituted or unsubstituted cyclic group comprising 2 to 5 carbon atoms or 2 to 4 carbon atoms and 1 to 3 hetero atoms selected from the group consisting of O, S, and N;

with the proviso that only up to two of groups $R^1$, $R^2$, and $R^3$ can be perfluorinated aryl or heterocycle; alkoxy, hydroxy, or halogen.

5. A system for polymerization comprising a monomer component and a metal compound as sole initiator, wherein the monomer component comprises a combination of $CO_2$ and at least one comonomer selected from the group of substituted or unsubstituted oxirane with 3 or 4 ring atoms, substituted or unsubstituted aziridine or azetidine, or a mixture thereof; and wherein the metal compound is $MR^1R^2R^3$, wherein M is aluminum, gallium, or indium, each of $R^1$, $R^2$, and $R^3$ independently is Cl, F, I, Br, linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, hydroxy, or carboxyl, wherein each alkyl, alkenyl, alkynyl or alkoxy group independently has up to 12 carbon atoms, wherein each aryl or heteroaryl independently has 5 to 14 ring atoms, wherein any hetero group has at least one hetero atom selected from the group consisting of O, S, and N, wherein each alkyl, alkenyl, alkynyl or alkoxy, heterocycloalkyl, heterocycloalkenyl, heterocycloalkynyl, aryl, heteroaryl, aryloxy group is optionally substituted by 1 up to the highest possible number of halogen atoms, or by at least one electron-donating or electron-withdrawing group; or wherein two of $R^1$, $R^2$, and $R^3$ together with M form a substituted or unsubstituted cyclic group comprising 2 to 5 carbon atoms or 2 to 4 carbon atoms and 1 to 3 hetero atoms selected from the group consisting of O, S, and N;

with the proviso that only up to two of groups $R^1$, $R^2$, and $R^3$ can be perfluorinated aryl or heterocycle; alkoxy, hydroxy, or halogen.

6. The system for polymerization according to claim 1, wherein the monomer component comprises at least one Michael-type monomer and/or at least one heterocyclic monomer and/or a combination of $CO_2$ and at least one comonomer selected from the group consisting of substituted or unsubstituted oxirane with 3 or 4 ring atoms, substituted or unsubstituted aziridine or azetidine, substituted or unsubstituted lactone having up to 9 ring atoms, substituted or unsubstituted lactam having up to 9 ring atoms, and substituted or unsubstituted 1,4-dioxan-2,4-dione, or a mixture thereof.

7. A process for polymerization of a monomer component using a metal compound as sole initiator, which comprises the steps:

a) contacting a monomer component, wherein the monomer component comprises at least one of a Michael-type monomer; and/or at least one substituted or unsubstituted lactone having up to 9 ring atoms, substituted or unsubstituted lactam having up to 9 ring atoms, substituted or unsubstituted 1,4-dioxan-2,4-dione, or a mixture thereof and/or a combination of $CO_2$ and at least one comonomer selected from the group of substituted or unsubstituted oxirane with 3 or 4 ring atoms, substituted or unsubstituted aziridine or azetidine, or a mixture thereof; with a metal compound $MR^1R^2R^3$, optionally dissolved in an organic solvent, wherein M is aluminum, gallium, or indium, each of $R^1$, $R^2$, and $R^3$ independently is Cl, F, I, Br, linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, hydroxy, or carboxyl, wherein each alkyl, alkenyl, alkynyl or alkoxy group independently has up to 12 carbon atoms, wherein each aryl or heteroaryl independently has 5 to 14 ring atoms, wherein any hetero group has at least one hetero atom selected from the group consisting of O, S, and N, wherein each alkyl, alkenyl, alkynyl or alkoxy, heterocycloalkyl, heterocycloalkenyl, heterocycloalkynyl, aryl, heteroaryl, aryloxy group can be substituted by 1 up to the highest possible number of halogen atoms, or by at least one electron-donating or electron-withdrawing group, with the proviso that not all three groups $R^1$, $R^2$, and $R^3$ are halogen, hydroxy, or alkoxy; or wherein two of $R^1$, $R^2$, and $R^3$ together with M form a substituted or unsubstituted cyclic group comprising 2 to 5 carbon atoms or 2 to 4 carbon atoms and 1 to 3 hetero atoms selected from the group consisting of O, S, and N; and b) continuing the polymerization reaction with the same, additional or other monomer component to form a polymer.

8. The process according to claim 7 wherein the Michael-type monomer of step a) is independently selected from the group consisting of acrylates, acrylonitrile, vinylphosphonates, vinylsulfonates, and vinylpyridines and/or wherein the at least one Michael-type monomer of step b) is independently selected from the group consisting of vinylphosphonates, vinylsulfonates, substituted or unsubstituted acrylates and methacrylates, substituted or unsubstituted acrylamides, acrylonitrile, vinylpyridines, vinyl ketones, acrolein, and acrolein derivates.

9. The process according to claim 7, wherein the ratio of initiator to monomer is 1:0.5 to 2000:1.

10. A polymer produced by the process of claim 7.

11. The polymer according to claim 10, wherein the polymer is a polymer or copolymer of one or more of Michael monomers selected from the group consisting of vinylphosphonate, vinylsulfonate, substituted or unsubstituted acrylate and methacrylate, substituted or unsubstituted acrylamide, acrylonitrile, vinylpyridine, vinyl ketone, acrolein, and an acrolein derivate.

12. A process for preparing a functionalized polymer comprising contacting $MR^1R^2R^3$, optionally dissolved in an organic solvent, with a monomer component as defined in claim 1, to form the functionalized polymer, wherein M is aluminum, gallium, or indium, each of $R^1$ and $R^2$ is independently F, I, Br or linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, hydroxy, or carboxyl, wherein each alkyl, alkenyl, alkynyl, or alkoxy independently has up to 12 carbon atoms, wherein each aryl or heteroaryl independently has 5 to 14 ring atoms, wherein any hetero group has at least one hetero atom selected from the group consisting of O, S, and N, wherein each alkyl, alkenyl, alkynyl or alkoxy, heterocycloalkyl, heterocycloalkenyl, heterocycloalkynyl, aryl, heteroaryl, aryloxy group is optionally substituted by 1 up to the highest possible number of halogen atoms; or wherein two of $R^1$, $R^2$, and $R^3$ together with M form a substituted or unsubstituted cyclic group comprising 2 to 5 carbon atoms or 2 to 4 carbon atoms and 1 to 3 hetero atoms selected from the group consisting of O, S, and N;

and wherein $R^3$ is a transferable group carrying at least one functional group.

13. The process for preparing a functionalized polymer according to claim 12, wherein the functional group is an olefinic group, an aromatic group, a heteroaromatic group, an alkynyl group, a mercapto group, a furfuryl group, a chemoactive or bioactive group, a nucleobase, wherein optionally the functionalized Michael-type monomer is furfuryl acrylate or furfuryl methacrylate.

14. The process for preparing a functionalized polymer according to claim 12, wherein the functional group is a luminescent unit or a unit eligible for inducing luminescence, wherein in formula I at least one groups of $R^1$, $R^2$, or $R^3$ is —[$Z^3$—Q], wherein $Z^3$ is a single bond, —C($R^8R^9$)—, —S—, —O—, or —N($R^{10}$)—, wherein $R^8$, $R^9$, $R^{10}$, independently are hydrogen or linear or branched $C_1$-$C_5$-alkyl;

wherein Q is an aromatic system comprising up to 3 aromatic rings, wherein the rings can independently be condensed or covalently linked, wherein the aromatic rings are independently 5- or 6-membered carbocyclic or heteroaromatic rings, at least one of which is a 5- or 6-membered heteroaromatic ring comprising at least one and up to 3 heteroatoms selected from the group consisting of N and S, wherein optionally Q has at least one unsubstituted carbon atom in a heteroaromatic ring in a position available for binding of an electrophilic substituent which is in vicinity to the heteroatom, wherein the system is optionally substituted by one or more substituents selected from linear or branched $C_1$-$C_5$-alkyl, $C_1$-$C_5$-alkoxy, amino, nitro, nitroso, cyano, halogen, $C_5$-$C_{10}$ aryl, $C_5$-$C_{10}$ heteroaryl, or $C_5$-$C_{10}$ aryloxy, with the proviso that Q has at least one unsubstituted carbon atom in a heteroaromatic ring in a position available for binding of an electrophilic substituent which is in vicinity to the heteroatom.

15. A process for preparing a polymer having increased syndio- or isotacticity comprising contacting $MR^1R^2R^3$, optionally dissolved in an organic solvent, with a monomer component as defined in claim 1, to form a polymer, wherein M is aluminum, gallium, or indium, each of $R^1$, $R^2$, and $R^3$, is independently F, I, Br or linear, branched or cyclic alkyl, heterocycloalkyl, linear, branched or cyclic alkenyl, heterocycloalkenyl, linear, branched, or cyclic alkynyl, heterocycloalkynyl, linear, branched, or cyclic alkoxy, aryl, heteroaryl, aryloxy, silyl, metallocenyl, hydroxy, or carboxyl, wherein each alkyl, alkenyl, alkynyl, or alkoxy independently has up to 12 carbon atoms, wherein each aryl or heteroaryl independently has 5 to 14 ring atoms, wherein any hetero group has at least one hetero atom selected from the group consisting of O, S, and N, wherein each alkyl, alkenyl, alkynyl or alkoxy, heterocycloalkyl, heterocycloalkenyl, heterocycloalkynyl, aryl, heteroaryl, aryloxy group is optionally substituted by 1 up to the highest possible number of halogen atoms; or wherein two of $R^1$, $R^2$, and $R^3$ together with M form a substituted or unsubstituted cyclic group comprising 2 to 5 carbon atoms or 2 to 4 carbon atoms and 1 to 3 hetero atoms selected from O, S or N, and wherein either all three groups $R^1$, $R^2$, and $R^3$ are different or $R^1$ and $R^2$ are the same and $R^3$ is different and is a bulky group.

16. A polymer produced by the process of claim 13.

* * * * *